United States Patent
Uesaki

(10) Patent No.: US 8,866,887 B2
(45) Date of Patent: Oct. 21, 2014

(54) COMPUTER GRAPHICS VIDEO SYNTHESIZING DEVICE AND METHOD, AND DISPLAY DEVICE

(75) Inventor: Akira Uesaki, Osaka (JP)

(73) Assignee: Panasonic Corporation, Osaka (JP)

( * ) Notice: Subject to any disclaimer, the term of this patent is extended or adjusted under 35 U.S.C. 154(b) by 660 days.

(21) Appl. No.: 13/258,730

(22) PCT Filed: Feb. 22, 2011

(86) PCT No.: PCT/JP2011/000978
§ 371 (c)(1),
(2), (4) Date: Sep. 22, 2011

(87) PCT Pub. No.: WO2011/105048
PCT Pub. Date: Sep. 1, 2011

(65) Prior Publication Data
US 2012/0013616 A1 Jan. 19, 2012

(30) Foreign Application Priority Data
Feb. 23, 2010 (JP) ................................. 2010-036794
Aug. 17, 2010 (JP) ................................. 2010-182039

(51) Int. Cl.
*H04N 13/00* (2006.01)
*H04N 13/02* (2006.01)

(52) U.S. Cl.
CPC ................................. *H04N 13/0275* (2013.01)
USPC ......................................................... 348/43

(58) Field of Classification Search
CPC ......................... H04N 13/0007; H04N 13/004
USPC .......................................................... 348/43
See application file for complete search history.

(56) References Cited

U.S. PATENT DOCUMENTS

2004/0208358 A1   10/2004  Tooyama et al.
2006/0143020 A1    6/2006  Zaima
(Continued)

FOREIGN PATENT DOCUMENTS

CN    101236662    8/2008
CN    101529924    9/2009
(Continued)

OTHER PUBLICATIONS

Chinese Office Action (OA) and Search Report (SR) issued Mar. 31, 2014 in corresponding Chinese Patent Application No. 201180001535.5, together with English translations thereof.
"Research on technologies for stereo film generation based on OPENGL", Science and Technology Information, vol. 15, 2009, together with English translation thereof.
International Search Report issued Mar. 22, 2011 in International (PCT) Application No. PCT/JP2011/000978.

*Primary Examiner* — Sath V Perungavoor
*Assistant Examiner* — Jeffery Williams
(74) *Attorney, Agent, or Firm* — Wenderoth, Lind & Ponack, L.L.P.

(57) ABSTRACT

A CG image combining device generates a CG image by mapping an image to an object. A memory unit stores shape data and a pair of left-view and right-view image data. A determination unit refers to the shape data to evaluate a curvature of the object's surface from normal vectors of polygons constituting the object. Furthermore, the determination unit determines whether the object is suitable for stereoscopic image mapping by comparing the curvature with a threshold. A mapping unit (i) generates left-view CG data by combining the left-view image data with the shape data and generates right-view CG data by combining the right-view image data with the shape data, when the object is suitable for the mapping, and (ii) generates left-view CG data and right-view CG data by combining one of the left-view and right-view image data with the shape data, when the object is not suitable for the mapping.

12 Claims, 22 Drawing Sheets

(56) References Cited

U.S. PATENT DOCUMENTS

| | | |
|---|---|---|
| 2006/0176295 A1 | 8/2006 | Toho et al. |
| 2007/0236493 A1* | 10/2007 | Horiuchi et al. ............. 345/419 |
| 2008/0037863 A1 | 2/2008 | Tooyama et al. |
| 2008/0180443 A1 | 7/2008 | Mihara |
| 2010/0110068 A1 | 5/2010 | Yamauchi et al. |

FOREIGN PATENT DOCUMENTS

| | | |
|---|---|---|
| JP | 2001-076180 | 3/2001 |
| JP | 2004-159889 | 6/2004 |
| JP | 2004-178581 | 6/2004 |
| JP | 2005-267655 | 9/2005 |

* cited by examiner

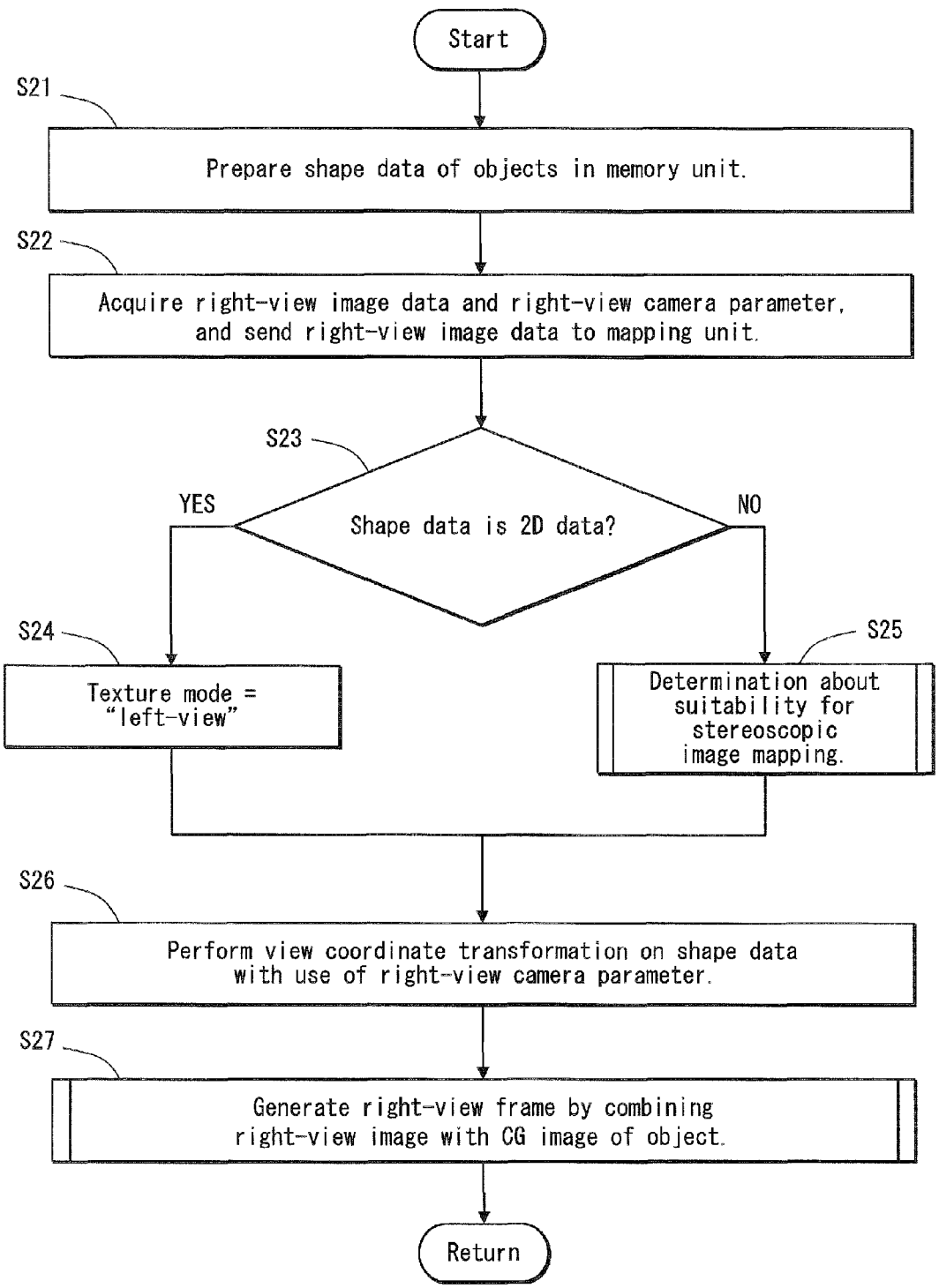

FIG. 9

| Polygon ID | Index | Normal Vector N[ID] |
|---|---|---|
| 0 | ( 0, 1, 2) | ( N[0]x, N[0]y, N[0]z) |
| 1 | ( 0, 3, 6) | ( N[1]x, N[1]y, N[1]z) |
| 2 | ( 0, 2, 3) | ( N[2]x, N[2]y, N[2]z) |
| 3 | ( 2, 3, 4) | ( N[3]x, N[3]y, N[3]z) |
| ⋮ | ⋮ | ⋮ |
| P-1 | ( p, q, r) | ( N[P-1]x, N[P-1]y, N[P-1]z) |

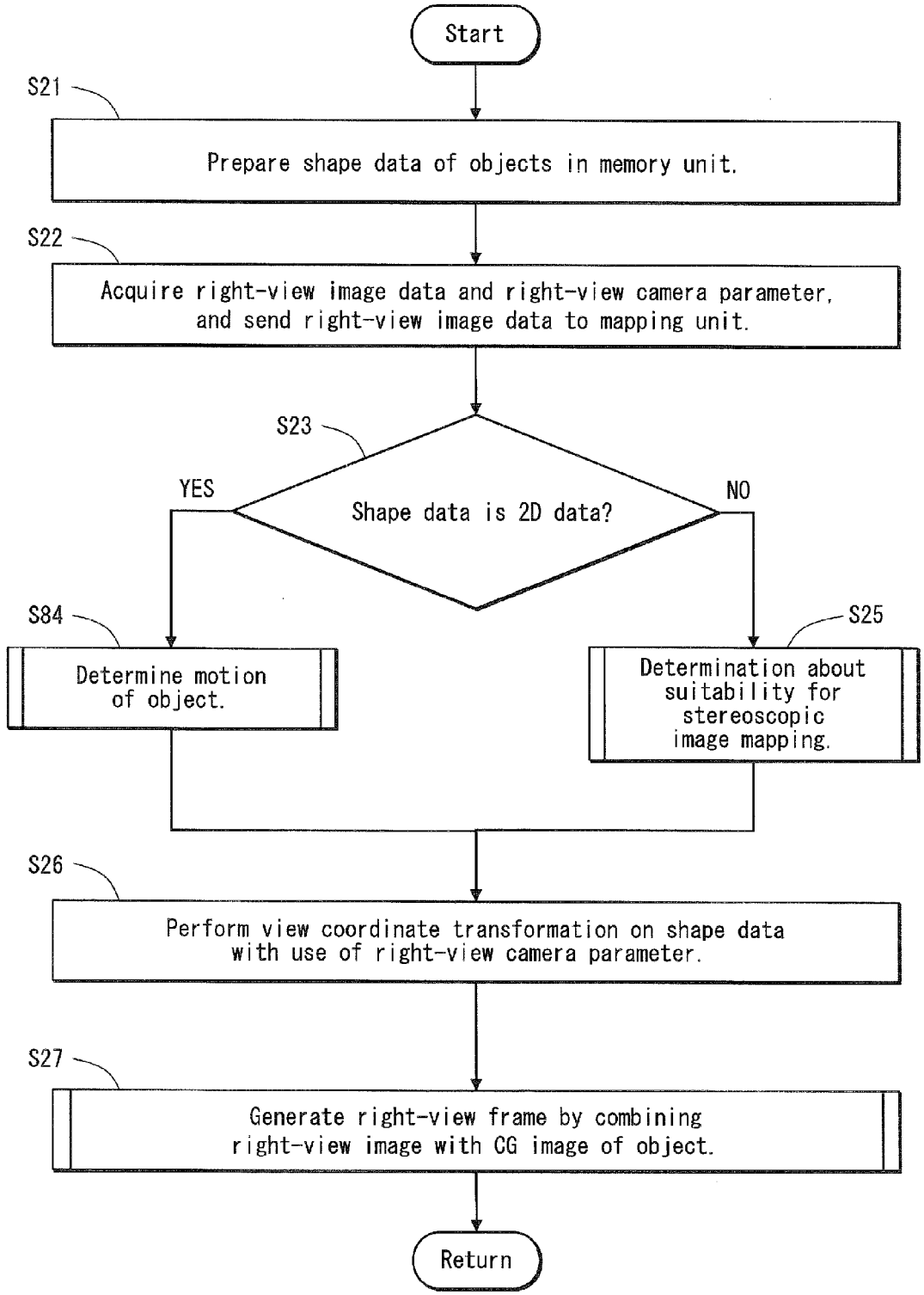

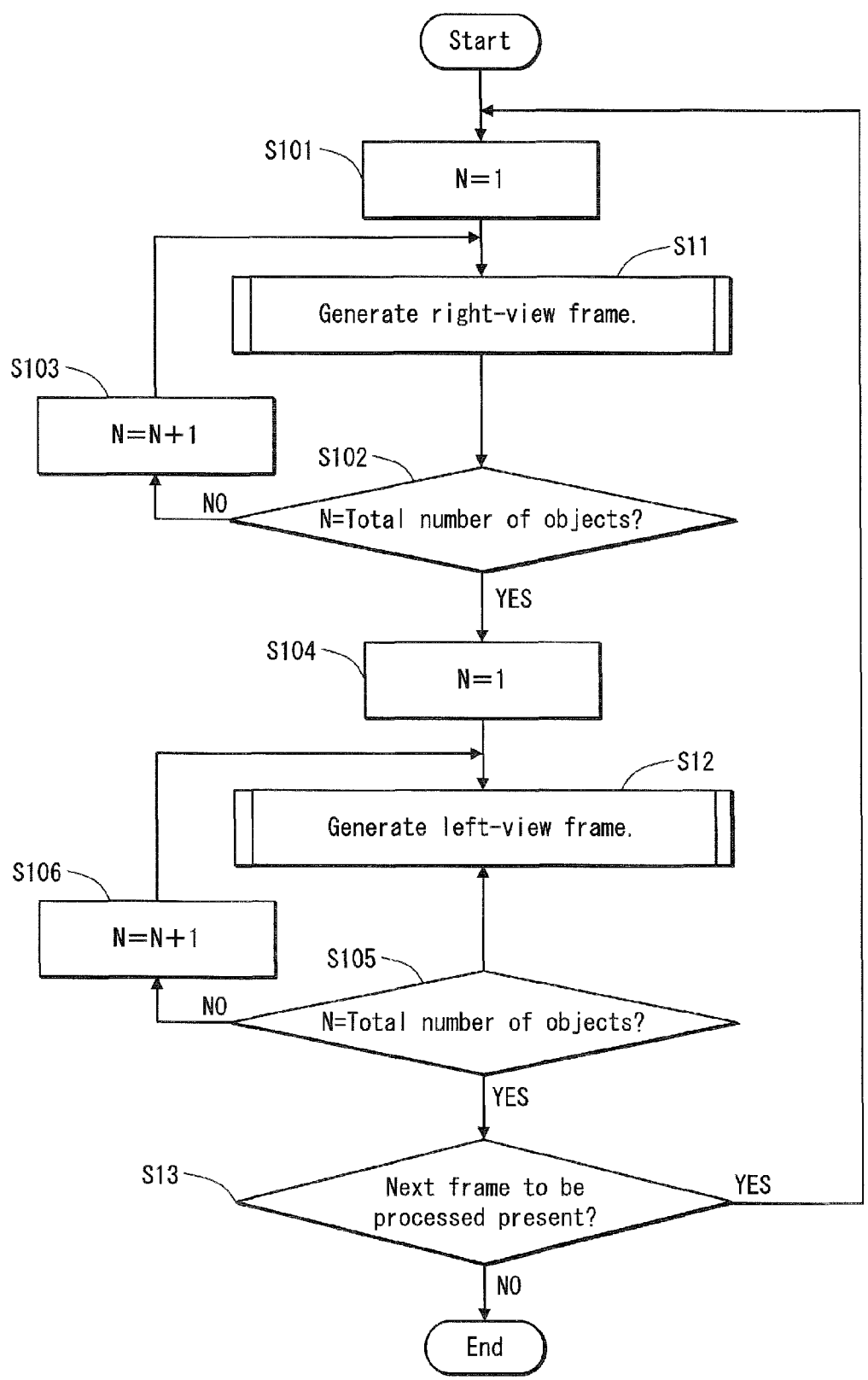

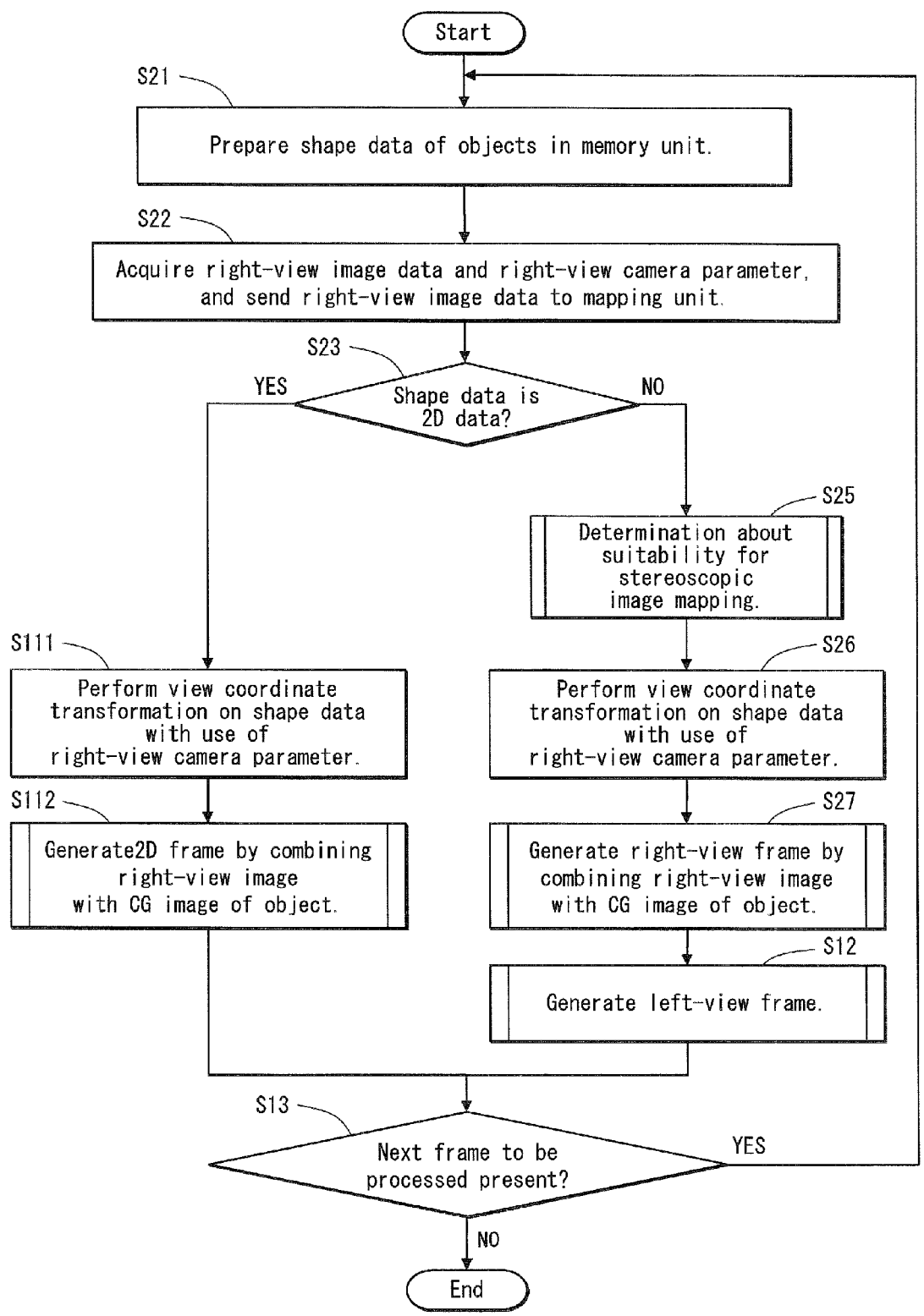

COMPUTER GRAPHICS VIDEO SYNTHESIZING DEVICE AND METHOD, AND DISPLAY DEVICE

TECHNICAL FIELD

The present invention relates to technologies for combining computer graphics (CG) images with stereoscopic images and for displaying the combined images.

BACKGROUND

Some video game devices and digital televisions of recent years are equipped with a viewer function or a slideshow function. By using these functions, users are able to display still/moving pictures filmed by their digital cameras on a display screen. Still/moving pictures in particular can be provided with various visual effects when combined with CG images. For example, a list of thumbnail images of still/moving pictures can be displayed on a screen, so as to prompt a user to select one of the still/moving pictures by using a graphics user interface (GUI). Following the user's selection, switching from the screen on which the list of the thumbnail images are displayed to a screen on which the selected still/moving picture is displayed can be represented by animation with CG images. Combining still/moving pictures and CG images as above provides entertainment to the user making the user operation, while improving operability of the GUI.

A still/moving picture is combined with a CG image as follows. To start with, a CG image called "object" is represented by an assembly of various graphics, such as a dot, a line, and a polygon. These object graphics may be represented either as images depicted on a two-dimensional (i.e. 2D) plane or as images residing in three-dimensional (i.e. 3D) virtual space. Next, a two-dimensional image (i.e. a texture) representing one frame constituting the still/moving picture is projected onto the object. This operation is called "mapping". When the object is represented as an image residing in 3D virtual space, "monoscopic images" of the object seen from a certain viewpoint, in other words, images of the object projected onto planes located between the object and the viewpoint, are additionally calculated. The monoscopic images thus obtained by combining the one frame constituting the still/moving picture with the object are displayed on a display screen. By deforming or displacing the object on the 2D plane or in 3D virtual space, the still/moving picture displayed on the surface of the object is also deformed or displaced accordingly.

Meanwhile, in recent years, more and more digital cameras and digital televisions equipped with a stereoscopic image display function are becoming popular in ordinary houses. A "stereoscopic image" denotes a combination of a left-view image and a right-view image which collectively represent one scene stereoscopically viewed by a viewer. The "left-view image" denotes a monoscopic image seen by the left eye of the viewer, and the "right-view image" denotes a monoscopic image seen by the right eye of the viewer. Between the left-view image and the right-view image, there is a difference due to binocular parallax of the viewer. As one method for displaying stereoscopic images, a "frame sequential method" is commonly used. In the frame sequential method, a left-view image and a right-view image are alternately displayed on a display screen. The viewer sees the images through a pair of shutter glasses. The shutter glasses make only the left eye lens transparent when the left-view image is displayed and make only the right eye lens transparent when the right-view image is displayed. As a result, the left-view image is shown only to the left eye of the viewer, while the right-view image is shown only to the right eye. This makes the viewer to perceive the difference between the left-view image and the right-view image as the binocular parallax for a single scene, and thus the two monoscopic images appear to be a single stereoscopic image.

In order to film a stereoscopic image of a real object, it is only necessary to place two digital cameras side by side to resemble the left eye and the right eye of the viewer, and film the object by these cameras at the same time. A technique for converting CG images into a stereoscopic image is also known. For example, Patent Literature 1 discloses a technique for generating a left-view image and a right-view image of an object by displacing a display position of the object on the 2D screen. The above techniques for representing still/moving pictures and CG images as stereoscopic images are expected to be applied to the aforementioned viewer function and slideshow function. It is hoped that using the stereoscopic images will give the viewer a sense of presence that is not available with monoscopic images, while exploring possibilities for a new form of visual effects.

CITATION LIST

Patent Literature

[Patent Literature 1]
Japanese patent application publication No. 2005-267655

SUMMARY OF INVENTION

Technical Problem

As a technique for generating a stereoscopic object image residing in 3D virtual space, the following has been developed. First of all, a monoscopic image of the object seen from a viewpoint corresponding to the left eye of a viewer, namely a left-view CG image, are generated, and a monoscopic image of the object seen from another viewpoint corresponding to the right eye of a viewer, namely a right-view CG image, are generated. Next, a left-view still/moving picture is mapped to the left-view CG image, and a right-view still/moving picture is mapped to the right-view CG image.

Each of the left-view and the right-view still/moving pictures are filmed in such a manner as to make the object appear most stereoscopic when seen from a direction of the camera. Accordingly, if the object has a plate-like flat surface extending substantially perpendicular to the visual direction, a stereoscopic image mapped to the surface properly appears to float above the surface or to be located behind the surface. However, if the object has a rough surface, a curved surface with a relatively high curvature, or a surface greatly inclined with respect to the visual direction, a stereoscopic image mapped to the surface is distorted, thus appearing less stereoscopic. Furthermore, even if the object is represented not as a stereoscopic image residing in 3D virtual space but as a monoscopic image projected onto the 2D screen, when the object is in motion at a relatively high speed, a stereoscopic image mapped to the surface of the object appears less stereoscopic.

On the other hand, mapping processing generally requires a large amount of calculation. In order to further improve the quality of the combined image of a still/moving picture and CG images, it is therefore preferable, under the condition that the still/moving picture appears less stereoscopic, to minimize an amount of loads required for the mapping processing so as to facilitate the combining processing.

An object of the present invention is to solve the above problems, and in particular to provide a CG image combining device that is capable of improving the quality of combined images by adjusting the mapping processing in accordance with the shape and the motion of the object.

Solution to Problem

One aspect of the present invention provides a CG image combining device for generating a CG image by mapping an image to an object, including a memory unit, a determination unit, and a mapping unit. The memory unit stores shape data and a pair of left-view image data and right-view image data. The shape data represents a shape of the object. The pair of left-view image data and right-view image data collectively representing a stereoscopic image. The determination unit determines from the shape data whether or not the object is suitable for mapping of the stereoscopic image. The mapping unit (i) generates left-view CG data by combining the left-view image data with the shape data and generate right-view CG data by combining the right-view image data with the shape data, when the determination unit has determined that the object is suitable for mapping of the stereoscopic image, and (ii) generates left-view CG data and right-view CG data by combining one of the left-view image data and the right-view image data with the shape data, when the determination unit has determined that the object is not suitable for mapping of the stereoscopic image.

When the shape data is 2D data representing the shape of the object on a 2D plane, the determination unit may determine whether or not the object is suitable for mapping of the stereoscopic image as follows. That is to say, the determination unit (i) determines, in each of a plurality of frames constituting the CG image, a representative point of the object from the 2D data, (ii) determines that the object is suitable for mapping of the stereoscopic image when a displacement of the representative point between two consecutive frames is less than a predetermined threshold, and (iii) determines that the object is not suitable for mapping of the stereoscopic image when the displacement of the representative point is greater than the predetermined threshold.

When the shape data is 3D data representing the shape of the object in 3D virtual space, the determination unit may determine whether or not the object is suitable for mapping of the stereoscopic image using any of the following three methods.

In the first method, the determination unit first (i) calculates normal vectors of polygons constituting the object from the 3D data and (ii) evaluates a curvature of a surface of the object from the calculated normal vectors. The determination unit then (iii) determines that the object is suitable for mapping of the stereoscopic image when the curvature is less than a predetermined threshold, and (iv) determines that the object is not suitable for mapping of the stereoscopic image when the curvature is greater than the predetermined threshold.

In the second method, the determination unit first (i) calculates brightnesses at vertices of polygons constituting the object from the 3D data. The determination unit then (ii) determines that the object is suitable for mapping of the stereoscopic image when a difference between a maximum brightness and a minimum brightness among the calculated brightnesses is less than a predetermined threshold, and (iii) determines that the object is not suitable for mapping of the stereoscopic image when the difference between the maximum brightness and the minimum brightness is greater than the predetermined threshold.

In the third method, the determination unit first (i) determines, in each of a plurality of frames constituting the CG image, a representative point of the object from vertices of polygons constituting the object. The determination unit then (ii) determines that the object is suitable for mapping of the stereoscopic image when a displacement of the representative point between two consecutive frames is less than a predetermined threshold, and (iii) determines that the object is not suitable for mapping of the stereoscopic image when the displacement of the representative point is greater than the predetermined threshold.

Summary of Invention

The above CG image combining device of the present invention determines from the shape data of the object whether or not the object is suitable for mapping. Consequently, the CG image combining device is able to adjust the mapping processing depending on the shape and motion of the object, thereby further improving the quality of combined images.

BRIEF DESCRIPTION OF DRAWINGS

FIG. 5 is a flowchart of the step 11 shown in FIG. 3, i.e., processing that the display device 10 according to the first embodiment of the present invention performs to generate a right-view frame.

FIG. 9 shows an exemplary polygon buffer.

FIG. 18 is a flowchart of the step S11 shown in FIG. 3 that the display device according to a fourth embodiment of the present invention performs.

FIG. 21 is a flowchart of processing to generate, when the display device displays a plurality of objects in one frame, right-eye and left-eye frames by mapping stereoscopic still/moving pictures to CG images of the objects.

FIG. 22 is a flowchart of processing performed by the display device to map, when the shape data of an object is 2D data, still/moving pictures as monoscopic images to a monoscopic CG image of the object.

DESCRIPTION OF EMBODIMENTS

The following describes preferred embodiments of the present invention with reference to the drawings.

First Embodiment

[Structure of Display Device]

Figure 1:
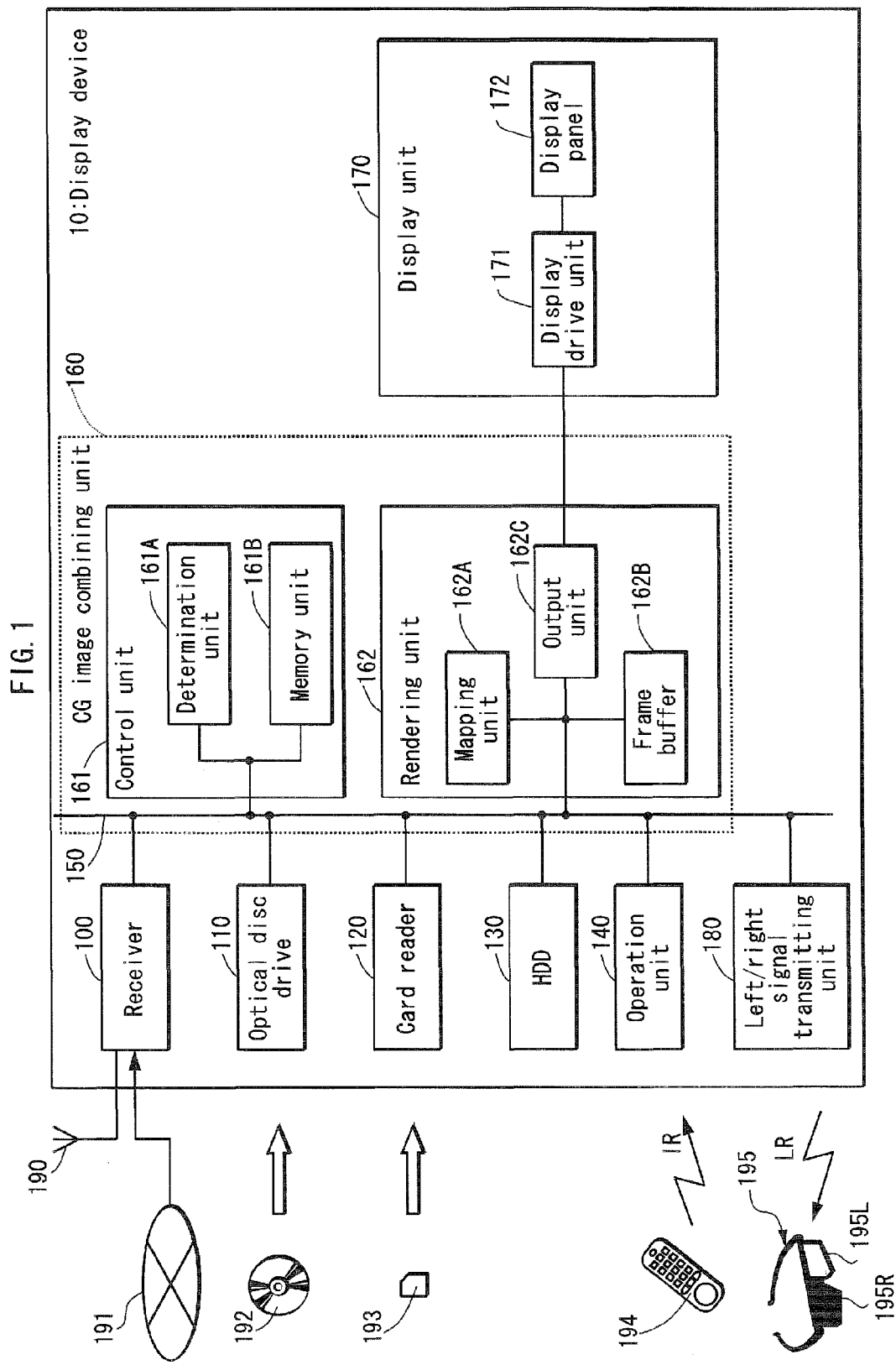
FIG. 1 is a function block diagram of a display device according to a first embodiment of the present invention.

FIG. 1 is a function block diagram of a display device according to the first embodiment of the present invention. The display device herein is a digital television set. The display device 10 may also be embedded in various electronic devices, such as a mobile phone, a mobile information terminal, a personal computer, a digital steel camera, a digital video camera, and a car navigation system. Referring to FIG. 1, the display device 10 includes an image data input unit, an operation unit 140, a system bus 150, a CG image combining unit 160, a display unit 170, and a left/right signal transmitting unit 180. The image data input unit includes a receiver 100, an optical disc drive 110, a card reader 120, and a hard disk drive (HDD) 130.

The receiver 100 receives broadcast waves of digital terrestrial television via an antenna 190 or an external network 191, such as a cable television. The receiver 100 also extracts image data of a desired channel from the broadcast waves and transmits the extracted image data to the CG image combining unit 160. The optical disc drive 110 is embedded in the display device 10, reads image data from an optical disc 192, such as a DVD or a BD (Blu-ray Disc™), and transmits the read image data to the CG image combining unit 160. The optical disc drive 110 may also be a separate unit external to the display device 10 or embedded in an optical disc playback device. The card reader 120 reads image data from a semiconductor memory card 193, such as an SD card, and transmits the read image data to the CG image combining unit 160. The HDD 130 is embedded in the display device 10, and stores therein the image data transmitted from the receiver 100, the optical disc drive 110, or the card reader 120. The HDD 130 also transmits the stored image data to the CG image combining unit 160.

The operation unit 140 detects a user operation through a remote control 194 or a front panel of the display device 10 and then requests the CG image combining unit 160 to perform processing appropriate for a type of the user operation. Note that the remote control 194 includes a plurality of buttons. Each button is associated with a function of the display device 10, such as turning on or off the display device 10, tuning a channel, adjusting the volume, and others. The remote control 194 detects when the user presses a button and conveys identification information for the button to the display device 10 as an infrared or radio signal IR. In response to the signal IR, the operation unit 140 determines the function associated with the button identified by the identification information and notifies the CG image combining unit 160 of the determined function.

The system bus 150 connects the image data input units 100-130 and the operation unit 140 with the CG image combining unit 160 so as to enable data exchange therebetween. The system bus 150 conforms to the PCI-Express standard. The system bus 150 may also conform to the PCI or AGP standard. Although this is not shown in FIG. 1, the system bus 150 includes a chip set. The chip set in particular converts the image data transmitted from the input units 100-130 into a format that the CG image combining unit 160 is able to process.

The CG image combining unit 160 includes a control unit 161 and a rendering unit 162. The control unit 161 and the rendering unit 162 are each implemented on a different integrated circuit. Each integrated circuit may be configured either as a dedicated circuit or as a circuit using a general-purpose processor. Alternatively, the control unit 161 and the rendering unit 162 may be implemented on a single LSI.

The control unit 161 controls various functional units of the display device 10 in accordance with a program, such as firmware. For example, the control unit 161 controls the rendering unit 162 to map images represented by the image data received from the input units 100-130 to CG images of an object.

Referring to FIG. 1, the control unit 161 includes a determination unit 161A and a memory unit 161B. When the image data represents a stereoscopic image, the determination unit 161A determines from the shape data of the object whether or not the object is suitable for mapping of the stereoscopic image (i.e. stereoscopic image mapping). The "shape data" denotes data indicating the shape of the object. The memory unit 161B is a memory device embedded in the control unit 161, and stores therein the program, such as firmware, and is used as a working memory area. The memory unit 161B also stores therein the shape data of the object. Furthermore, the memory unit 161B acquires from the input units 100-130 the image data to be mapped and temporarily holds the acquired image data. When the image data represents a stereoscopic image, the memory unit 161B holds a pair of left-view image data and right-view image data which collectively represent the stereoscopic image.

The rendering unit 162 performs processing (i.e. bitBLT) of transferring the image data from the memory unit 161B to a frame buffer 162B under control of the control unit 161. The rendering unit 162 also performs various processing, such as scaling and applying visual effects by using CG, on the image data. Specifically, the rendering unit 162 maps images represented by the image data to the CG images of the object. Referring back to FIG. 1, the rendering unit 162 includes a mapping unit 162A, the frame buffer 162B, and an output unit 162C. The mapping unit 162A combines the left-view image and/or the right-view image stored in the memory unit 161B with the shape data of the object, in accordance with a result of the determination performed by the determination unit 161A. To be more precise, when the determination unit 161A determines that the object is suitable for mapping of the stereoscopic image, the mapping unit 162A generates left-view CG data by combining the left-view image data with the shape data and generates right-view CG data by combining the right-view image data with the shape data. On the other hand, when the determination unit 161A determines that the object is not suitable for mapping of the stereoscopic image, the mapping unit 162A generates the left-view CG data and the right-view CG data by combining only the right-view image data with the shape data. Details will be described below. The frame buffer 162B is an area within a memory device embedded in the rendering unit 162, and holds the combined CG data generated by the mapping unit on a frame-by-frame basis. The output unit 162C reads a frame from the frame buffer 162B, converts the read frame into a NTSC, PAL, or SECAM output format, and transmits the converted frame to the display unit 170. The output unit 162C also performs various processing on the image data. Some examples of the processing are scaling, IP conversion, noise reduction, and frame rate conversion. The scaling is processing of enlarging/reducing an image size. The IP conversion is processing of converting a scanning method between progressive scanning and interlaced scanning The noise reduction is processing of removing noise from an image. The frame rate conversion is processing of converting a frame rate.

The display unit 170 causes a display panel 172 to display the frame generated by the CG image combining unit 160. Specifically, when the image data represents the stereoscopic image, the display unit 170 causes the display panel 172 to alternately display a left-view CG image represented by the left-view CG data and a right-view CG image represented by the right-view CG data. Referring to FIG. 1, the display unit 170 includes a display drive unit 171 and the display panel 172. The display drive unit 171 controls the display panel 172 in accordance with a signal transmitted from the output unit 162C. The display panel 172 is a liquid display panel (LCD). The display panel 172 may also be other types, such as a plasma display panel and an organic EL display panel.

The left/right signal transmitting unit 180 transmits a left/right signal LR via infrared rays or radio transmission to the shutter glasses 195. The left/right signal LR indicates which one of the left-view frame and the right-view frame is currently displayed on a screen of the display panel 172. During playback of stereoscopic images, the control unit 161 detects switching of frames by distinguishing between a left-view frame and a right-view frame from a control signal (e.g. a synchronization signal) and auxiliary data which accompany the image data. Furthermore, the control unit 161 causes the left/right signal transmitting unit 180 to change the left/right signal LR in synchronization with the detected switching of frames. The shutter glasses 195 include two liquid crystal display panels 195L and 195R and a left/right signal receiving unit. The liquid crystal display panels 195L and 195R respectively constitute the left and right lens parts. The left/right signal receiving unit receives a left/right signal LR, and in accordance with changes of the received signal, causes each of the liquid crystal display panels 195L and 195R either to transmit light through the entire panel or to block light. For example, when the left/right signal LR indicates a left-view display, the liquid crystal display panel 195L for the left eye transmits light, while the liquid crystal display panel 195R for the right eye blocks light. When the left/right signal LR indicates a right-view display, the liquid crystal display panels act in the reverse manner. In this way, the two liquid crystal display panels 195L and 195R alternately transmit light in synchronization with the switching of frames. As a result, when a viewer looks at the screen of the display panel 172 while wearing the shutter glasses 195, the left-view frame is shown only to the viewer's left eye, and the right-view frame is shown only to the viewer's right eye. At that time, the viewer is made to perceive the difference between the images seen by the respective eyes as the binocular parallax for the same stereoscopic image, and thus the image appears to be stereoscopic.

[Structure of CG Image Combining Unit]

Figure 2:
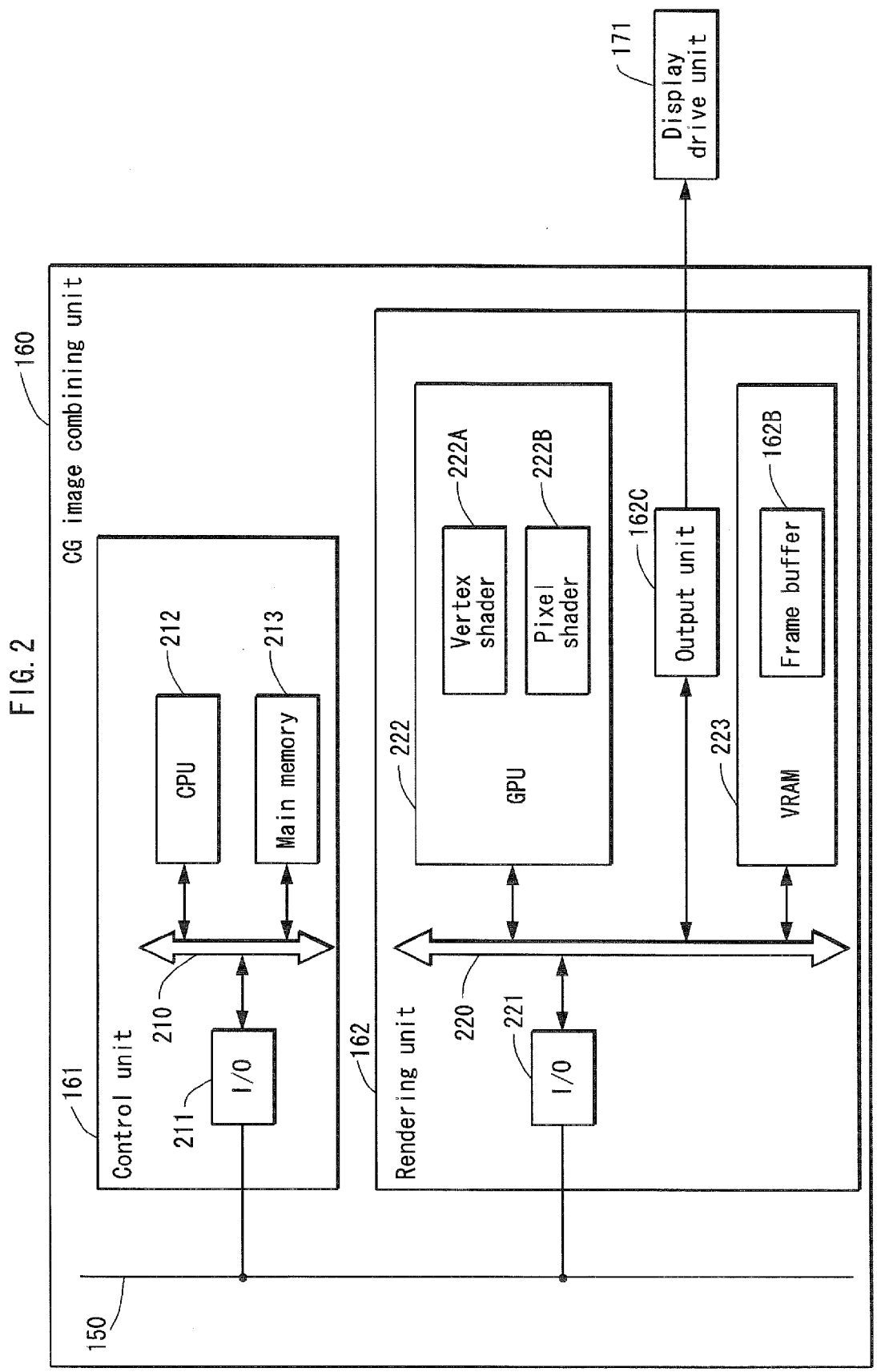
FIG. 2 is a block diagram showing a hardware structure of a CG image combining unit 160 shown in FIG. 1.

FIG. 2 is a block diagram showing a hardware structure of the CG image combining unit 160. Referring to FIG. 2, the control unit 161 includes a first internal bus 210, a first input/output interface (i.e. I/O) 211, a CPU 212, and a main memory 213. In addition to the output unit 162C, the rendering unit 162 includes a second internal bus 220, a second I/O 221, a processor dedicated to graphics processing (GPU: Graphic Processor Unit) 222, and a video memory (VRAM) 223.

The first internal bus 210 connects the functional blocks 211, 212, and 213 of the control unit 161 so as to enable data exchange therebetween. The first I/O 211 is a bus bridge that connects the first internal bus 210 with the system bus 150.

The first I/O 211 conforms to the PCI-Express standard. The first I/O 211 may also conform to the PCI or the AGP standard.

The CPU 212 executes a program stored in the main memory 213, transmits image data to be processed to the rendering unit in accordance with the program, and controls operations of various functional blocks included in the rendering unit 162. Specifically, the CPU 212 causes the rendering unit 162 to transfer the image data from the main memory 213 to the VRAM 223. Furthermore, the CPU 212 functions as the determination unit 161A shown in FIG. 1.

The main memory 213 is a synchronous DRAM (SDRAM), and is preferably a DDR (Double-Data-Rate)-SDRAM. The main memory 213 is used as the memory 161B shown in FIG. 1.

The second internal bus 220 connects the functional blocks 221, 222, 162C, and 223 of the rendering unit 162 so as to enable data exchange therebetween. The second I/O 221 is a bus bridge that connects the second internal bus 220 with the system bus 150. The second I/O 211 conforms to the PCI-Express standard. The second I/O 222 may also conform to the PCI or the AGP standard.

The GPU 222 is a logical circuit composed of, for example, a specialized chip for arithmetic processing necessary for graphics display. The CG processing performed by the GPU 222 includes geometry processing and rendering processing. The geometry processing uses geometric calculation, in particular coordinate transformation, to determine the layout of objects projected onto a 2D plane from 3D virtual space where the objects are supposed to reside. The rendering processing generates image data of an image to be actually displayed on the screen of the display panel 172, based on the layout of objects on the 2D plane determined by the geometry processing. The rendering processing includes hidden surface removal, shading, shadowing, texture mapping, and the like. The GPU 222 functions particularly as the mapping unit 162A shown in FIG. 1.

Referring to FIG. 2, the GPU 222 includes a vertex shader 222A and a pixel shader 222B. The vertex shader 222A is a computing unit dedicated to geometry processing, used in geometric calculation required for geometry processing, in particular calculation related to coordinate transformation. The vertex shader 222A may be composed of computing units each provided for a different type of geometric calculation, or a computing unit capable of performing various types of geometric calculation depending on programs. The pixel shader 222B is a computing unit dedicated to the rendering processing and used in calculation related to color information of each pixel, i.e. pixel data, required for the rendering processing. The pixel shader 222B reads image data from the VRAM 223 pixel by pixel, and calculates a sum and a product of components of the read image data pixel by pixel. The pixel shader 222B may be composed of computing units each provided for a different type of calculation related to pixel data processing, or a computing unit capable of performing various types of calculation pixel by pixel depending on programs. In addition, a single programmable computing unit may be used as the vertex shader 222A and the pixel shader 222B depending on programs.

The VRAM 223 is an SDRAM embedded in the rendering unit 162, and is preferably a DDR-SDRAM or GDDR (Graphic-DDR)-SDRAM. Specifically, the VRAM 223 includes the frame buffer 162B as shown in FIG. 1. The frame buffer 162B includes memory cells of the VRAM223. Each of the memory cells corresponds to one pixel of the display panel 172 and stores therein the pixel data about the pixel.

[Operations of CG Image Combining Unit]

The display device 10 provides stereoscopic effects to the viewer function or the slideshow function, with use of the elements shown in FIG. 1 and FIG. 2. In particular, the display device 10 acquires stereoscopic still/moving pictures through the input units 100-130, maps the acquired stereoscopic still/moving pictures to CG images of an object with use of the CG image combining unit 160, and displays the combined images on the screen of the display panel 172. As described below, the display device 10 according to the first embodiment switches the images representing the still/moving pictures to be mapped between stereoscopic images and monoscopic images depending on the shape of the object to which these pictures are to be mapped.

Figure 3:
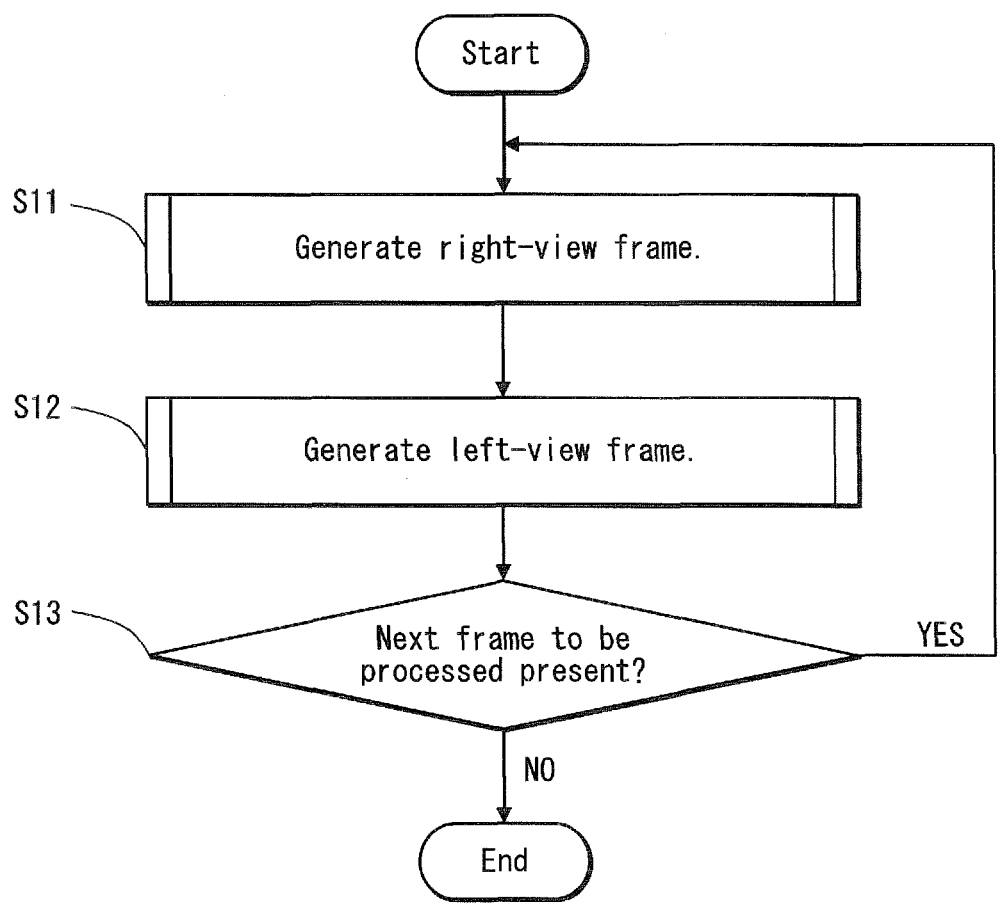
FIG. 3 is a flowchart of processing performed by the display device according to the first embodiment to generate right-view and left-view frames by mapping stereoscopic still/moving pictures to CG images of an object.

FIG. 3 is a flowchart of processing performed by the display device 10 to generate right-view and left-view frames by mapping stereoscopic still/moving pictures to CG images of an object. The display device 10 starts the processing upon receiving via the operation unit 140 a user instruction to execute the viewer function or the slideshow function. In step S11, the display device 10 generates a right-view frame from a stereoscopic still/moving picture acquired from the input unit 100-130. In the next step S12, the display device 10 generates a left-view frame from the still/moving picture. The frame data generated in the steps S11 and S12 is transmitted to the display unit 170. The display unit 170 alternately displays the generated frames on the screen of the display panel 172. Synchronously with the switching of those frames, the control unit 161 causes the left/right signal transmitting unit 180 to change the state of the left/right signal LR. In the next step S13, the display device 10 checks whether a next frame to be processed is present in the still/moving pictures. If the next frame is present, the processing from the step S11 is repeated. If the next frame is not present, the processing ends.

[Shape Data of Object]

The type of shape data includes 2D data and 3D data. The 2D data represents the shape of the object in the 2D plane. The 3D data represents the shape of the object in 3D virtual space.

Figure 4A:
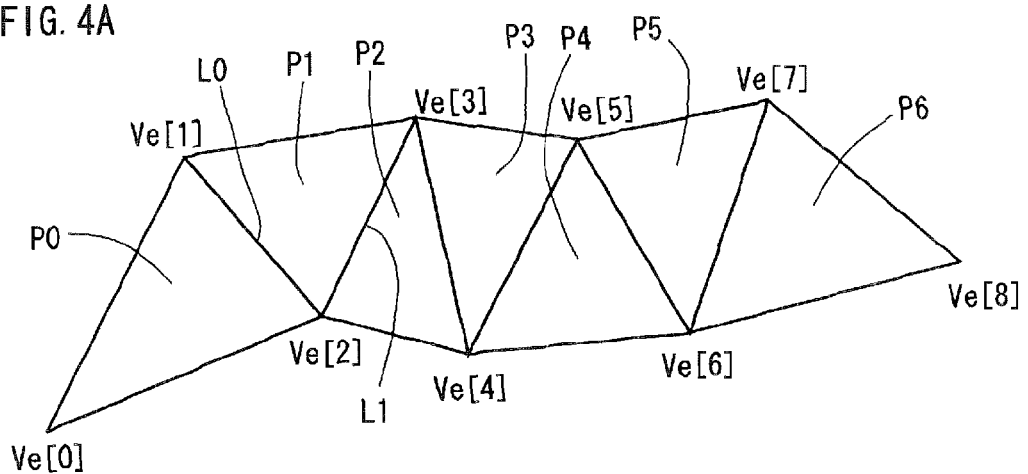
FIGS. 4A, 4B, and 4C are schematic diagrams each showing a different representational form of polygons defining the shape of the object.
Figure 4B:
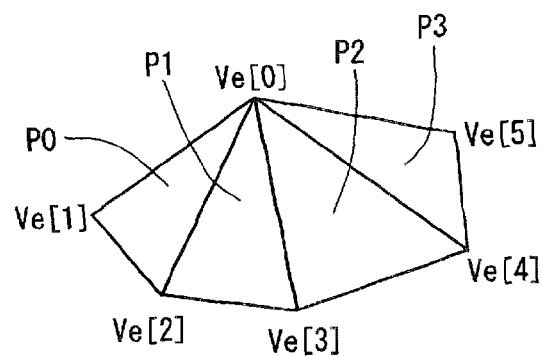
Figure 4C:
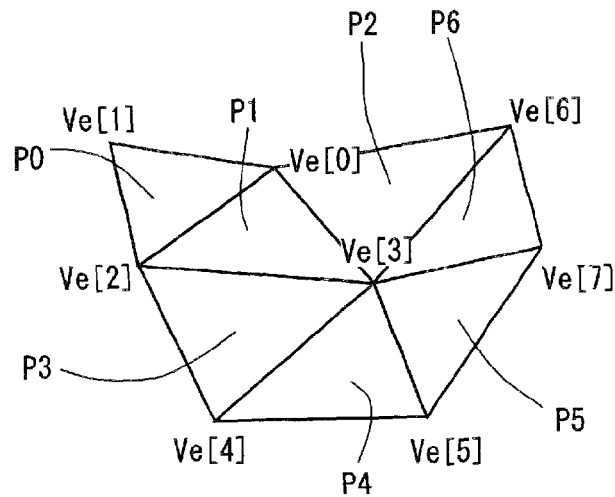

Shape data represents the shape of the object by an assembly of triangles which are called "polygons". There are three representational forms of the polygons. FIGS. 4A to 4C are schematic diagrams each showing a different one of the three representational forms. Referring to FIGS. 4A to 4C, in any representational form, polygons P0, P1, P2, . . . each contain three vertices Ve[m] (m=0, 1, 2, . . . ). The vertices Ve[m] are each assigned with a serial number m called "index" in increasing order starting from 0. Shape data defines polygons to be displayed in each frame by coordinates of the vertices Ve[m] and the indexes of the vertices contained in the polygons. The coordinates of the vertices Ve[m] are represented by 2D vectors (x, y) as for 2D data and represented by 3D vectors (x, y, z) as for 3D data. Alternatively, the coordinates of the vertices Ve[m] may be represented by four-dimensional homogeneous coordinates (x, y, z, 1).

Seven polygons P0, P1, P2, . . . , P6 shown in FIG. 4A are represented by the first representational form called "triangular strip". The triangular strip P0-P6 are connected to each other with each side shared by two adjacent polygons. For example, the first polygon P0 and the second polygon P1 share a side L0 joining the second vertex Ve[1] and the third vertex Ve[2], and the second polygon P1 and the third polygon P2 share a side L1 joining the third vertex Ve[2] and the fourth vertex Ve[3]. The four polygons P0, P1, P2, and P3 shown in FIG. 4B are represented by the second representational form called "triangular fan". The triangular fan P0-P3 are connected to each other with one vertex Ve[0] shared by the polygons. Shape data defines the triangular strip and the triangular fan as follows. First of all, the first polygon P0 is defined by using the three vertices Ve[0], Ve[1], and Ve[2]. Subsequently, the other polygons P1, P2, . . . are each defined by one vertex different from already-used vertices. For example, the second polygon P1 is defined by using the fourth vertex Ve[3], and the third polygon is defined by using the fifth vertexVe[4].

The seven polygons P0, P1, P2, . . . , P6 shown in FIG. 4C are represented by the third representational form called "triangular mesh". The triangular mesh defines each of the polygons by using a set of indexes (p, q, r) corresponding to three vertices Ve[p], Ve[q], and Ve[r]. For example, the first polygon P0 is defined by a set of indexes (0, 1, 2) corresponding to the first vertex Ve[0], the second vertex Ve[1], and the third vertex Ve[2]. For example, the second polygon P1 is defined by a set of indexes (0, 2, 3) corresponding to the first vertex Ve[0], the third vertex Ve[2], and the fourth vertex Ve[3].

Shape data also includes attribute values provided to the respective vertices. Each attribute value includes a normal vector and a texture coordinate. The normal vector herein is obtained by normalizing normal vectors of the polygons sharing the vertex. The normal vector is used for calculating brightness of the polygons. The texture coordinate represents 2D coordinates of a portion of a monoscopic image, i.e. texture, to be mapped to the polygons, the portion to be mapped to the vertex. Note that shape data may include vertex color values instead of normal vectors. The vertex color values represent color coordinate values of the respective vertices. Furthermore, shape data may include certain attributes which are processed by the vertex shader 222A.

[Generation of Right-View Frame]

FIG. 5 is a flowchart of the step S11 shown in FIG. 3, i.e., processing that the display device 10 performs to generate the right-view frame.

In step S21, the control unit 161 prepares, in the memory unit 161B, shape data of objects. Subsequently, the processing moves to step S22.

In the step S22, the control unit 161 acquires, from image data received from the input units 100-130, right-view image data and right-view camera parameters. The camera parameters are parameters included in the auxiliary data attached to the image data, and represent a camera position, camera orientation, and angle of view which are set when the camera is used to shoot the image data. The camera parameters in particular include a coordinate transformation matrix. The coordinate transformation matrix is used in specifying the viewpoint and visual direction of the viewer in view coordinate transformation. The "view coordinate transformation" denotes transformation from global coordinate system to view coordinate system. The "global coordinate system" denotes an orthogonal coordinate system defined in 3D virtual space. The "view coordinate system" denotes an orthogonal coordinate system composed of two axes extending orthogonal to each other on the 2D plane to which the object in 3D virtual space is to be projected, as well as an axis perpendicular to the 2D plane. When the coordinates of vertices of polygons are represented by four-dimensional homogeneous coordinates, the coordinate transformation matrix included in the camera parameters is a 4×4 matrix. In addition to the right-view camera parameters defining the viewpoint of the right eye, left-view camera parameters defining the viewpoint of the left eye of the viewer are attached to the stereoscopic image data. The control unit 161 extracts the right-view camera parameters from the image data and stores the extracted right-view camera parameters in the memory unit 161B. On the other hand, the control unit 161 extracts the right-view image data from the image data and transmits the extracted image data to the mapping unit 162A. Subsequently, the processing moves to step S23.

Figure 6:
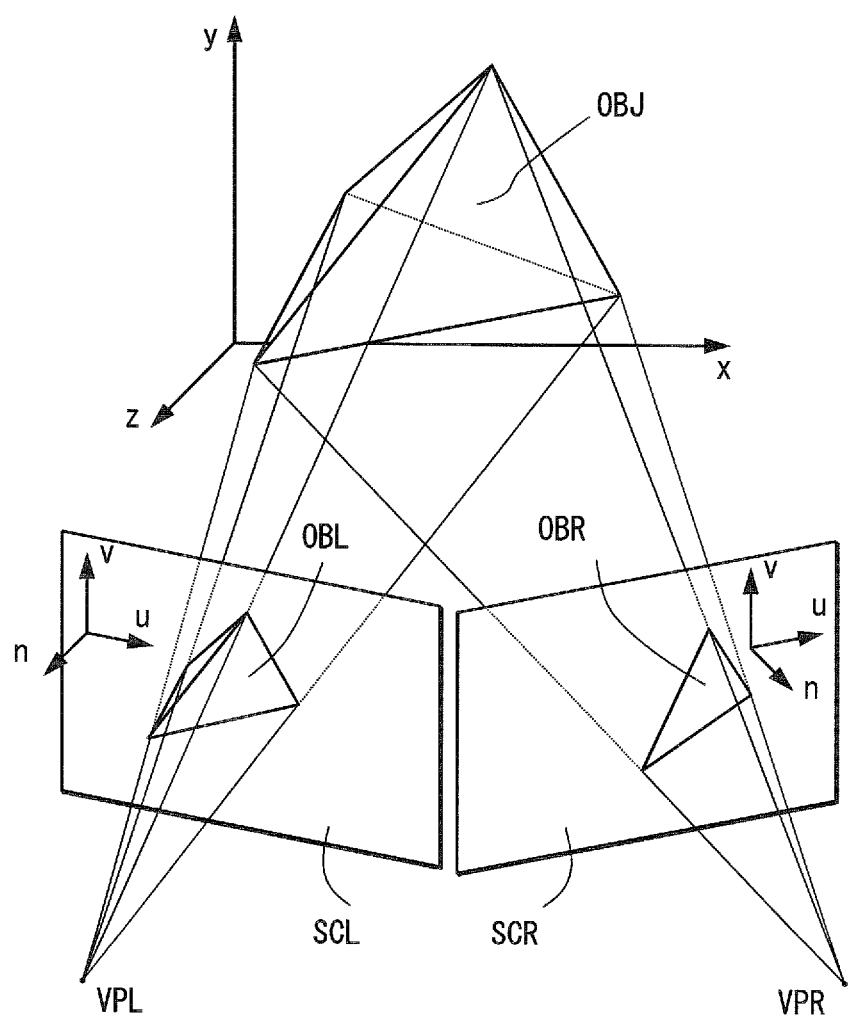
FIG. 6 is a schematic diagram of view coordinate transformation.

FIG. 6 is a schematic diagram of view coordinate transformation. Referring to FIG. 6, the global coordinate system (x, y, z) is defined in 3D virtual space in which an object OBJ resides. The view coordinate system (u, v, n) is defined for each of a left-view 2D screen SCL and a right-view 2D screen SCR. The screens SCL and SCR represent screens viewed from the viewpoints VPL and VPR of the respective eyes of a viewer. n axes, which are perpendicular to the respective screens SCL and SCR, extend from the respective screens SCL and SCR towards the respective viewpoints VPL and VPR. The global coordinate (x, y, z) of each vertex of the object OBJ is transformed into the view coordinate (u, v, n) of the same vertex of the object projected to the left-view 2D screen SCL, using the left-view camera parameter. The global coordinate (x, y, z) of each vertex of the object OBJ is also transformed into the view coordinate (u, v, n) of the same vertex of the object projected to the right-view 2D screen SCR, using the right-view camera parameter.

Referring back to FIG. 5, in the step S23, the determination unit 161A refers to the shape data of an object prepared in the memory unit 161B and determines whether or not the shape data is 2D data. When the shape data is 2D data, the processing moves to step S24. When the shape data is not 2D data, the processing moves to step S25.

In the step S24, the determination unit 161A sets a texture mode to "left-view". The texture mode is an environment variable that is referred to in the step S12 of generating the left-view frame, and defines which one of the left-view and the right-view still/moving pictures is to be mapped to the left-view CG image of the object. When the object has a 2D shape, the stereoscopic image mapped thereto properly appears to be stereoscopic. Since the shape data of the object is 2D data in the step S24, the texture mode is set so that the left-view still/moving picture is mapped to the left-view CG image of the object. This texture mode is stored in the memory unit 161B. Subsequently, the processing moves to step S26.

In the step S25, since the shape data is 3D data, the determination unit 161A further determines from the shape data of the object whether or not the shape of the object is suitable for mapping of the stereoscopic image. The determination unit 161A sets the texture mode according to a result of the determination. Details of the determination will be described later. After the step S25, the processing moves to the step S26.

In the step S26, the control unit 161 causes the rendering unit 162 to use the right-view camera parameter to perform view coordinate transformation on the shape data of the object. More particularly, the control unit 161 first causes the rendering unit 162 to transform the coordinate values of the vertices represented by the shape data into four-dimensional homogeneous coordinate values. When the shape data is 2D data, the 2D coordinate values $(x[i], y[i])^T$ (where the letter "T" indicates transposition) of the (i+1)th vertex Ve[i] (i=0, 1, 2, . . . ) are transformed into the four-dimensional homogeneous coordinate values $Vh[i]=(x[i], y[i], 0, 1)^T$. When the shape data is 3D data, the 3D coordinate values $(x[i], y[i], z[i])^T$ of the (i+1)th vertex Ve[i] (i=0, 1, 2, . . . ) are transformed into the four-dimensional homogeneous coordinate values $Vh[i]=(x[i], y[i], z[i], 1)^T$. Subsequently, the control unit 161 causes the rendering unit 162 to calculate products Mv*Vh[i] (where the operator "*" produces a product of a matrix and a column vector) of the coordinate transformation matrix Mv included in the right-view camera parameters and the four-dimensional homogeneous coordinate values $Vh[i]=(x[i], y[i], z[i], 1)^T$ of the vertices. The vertex shader 222A is utilized for the calculation. Subsequently, the processing moves to step S27.

Although 2D data is also transformed into the four-dimensional homogeneous coordinate in the step S26, this is not limiting. Regarding 2D data, if it is certainly assured in advance that only two-dimensional coordinate transformation is performed on 2D data, 2D data may be processed while remaining as the data represented on the two-dimensional coordinate.

In the step S27, the control unit 161 causes the mapping unit 162A to use the shape data represented by the view coordinate values to map the right-view still/moving picture to the CG image of the object. Details of the mapping processing will be described later. Thus, the right-view still/moving picture is combined with the CG image of the object, and thus the right-view frame is generated.

[Determination about Suitability for Stereoscopic Image Mapping]

Figure 7:
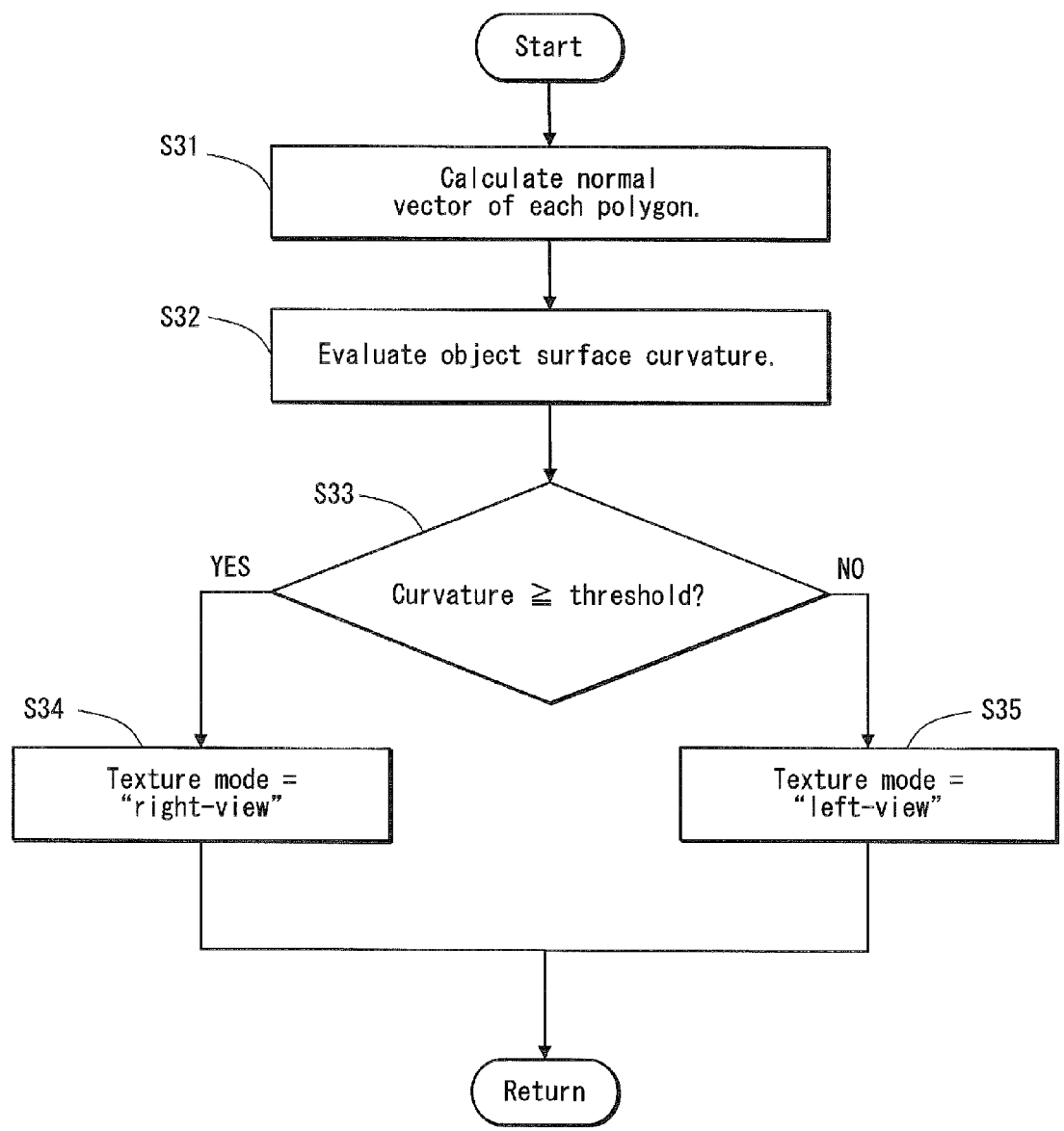
FIG. 7 is a flowchart of step S25 shown in FIG. 5.

FIG. 7 is a flowchart of the step S25 shown in FIG. 5. In the step S25, the determination unit 161A determines whether or not the shape of the object is suitable for mapping of the stereoscopic image. As described below, in the first embodiment of the present invention, the determination unit exploits an object surface curvature for the determination.

In step S31, the determination unit 161A causes the rendering unit 162 to refer to 3D data of the object and then calculate the normal vector $N[k]$ (where k=0, 1, 2, 3, . . . ) of each polygon Pk. A specific method for the calculation will be described later. Subsequently, the processing moves to step S32.

In step S32, the determination unit 161A causes the rendering unit 162 to evaluate the object surface curvature from the normal vector of each polygon Pk. A specific method for the evaluation will be described later. Subsequently, the processing moves to step S33.

In the step S33, the determination unit 161A determines whether or not the curvature value evaluated in the step S32 is equal to or greater than a predetermined threshold by comparing the curvature value with the predetermined threshold. The threshold indicates a curvature value obtained when the stereoscopic image mapped to the object surface fails to appear to be stereoscopic, providing that the object surface curvature is gradually increased starting from 0. The threshold is stored in the memory unit 161B in advance by the control unit 161. When the curvature is equal to or greater than the threshold, the processing moves to step S34. When the curvature is less than the threshold, the processing moves to step S35.

In the step S34, the determination unit 161A sets the texture mode to "right-view". Since the object surface curvature is equal to or greater than the threshold, the stereoscopic image mapped to the object surface would not appear to be stereoscopic. For this reason, the texture mode is set so that the right-view still/moving picture is to be mapped to the left-view CG image of the object as is the case of the right-view CG image. This texture mode is stored in the memory unit 161B. Subsequently, the processing moves to the step S26 shown in FIG. 5.

In the step S35, the determination unit 161A sets the texture mode to "left-view". Since the object surface curvature is less than the threshold, the stereoscopic image mapped to the object surface properly appears to be stereoscopic. For this reason, the texture mode is set so that the left-view still/moving picture is to be mapped to the left-view CG image of the object. This texture mode is stored in the memory unit 161B. Subsequently, the processing moves to the step S26 shown in FIG. 5.

[Calculation of Normal Vectors of Polygons]

In the step S31 shown in FIG. 7, the normal vectors of the respective polygons are calculated by one of the following two methods.

The first method is to calculate the normal vectors of the polygons from coordinate values of the vertices contained in the polygons. To be specific, suppose that the four-dimensional homogeneous coordinate values of the three vertices Ve[0], Ve[1], and Ve[2] constituting the polygon P0 are the following values: $Vh[0]=(x[0], y[0], z[0], 1)^T$, $Vh[1]=(x[1], y[1], z[1], 1)^T$, $Vh[2]=(x[2], y[2], z[2], 1)^T$. In this case, the first vector v0, which is directed from the first vertex Ve[0] to the second vertex Ve[1], and the second vector v1, which is directed from the first vertex Ve[0] to the third vertex Ve[2], are respectively represented as three-dimensional vector values: $v0=(x[1]-x[0], y[1]-y[0], z[1]-z[0])$, $v1=(x[2]-x[0], y[2]-y[0], z[2]-z[0])$. Next, from the vector values v0 and v1, the normal vector $N[0]$ of the polygon P0 is obtained by the following equation: $N[0]=\text{Normalize}(v0 \times v1)$. Here, the operator "x" produces a vector product. The function "Normalize (V)" denotes normalization of the vector V, and is defined by the following equation: $\text{Normalize}(V)=V/|V|$ (where the operator "|·|" denotes a vector length). Thus, the length of the normal vector $N[0]$ equals 1.

The second method is to calculate, when 3D data defines normal vectors as attributes of the vertices, normal vectors of the respective polygons from the defined normal vectors. To be specific, suppose that the three vertices Ve[0], Ve[1], and Ve[2] constituting the polygon P0 are respectively defined with the normal vectors Ne[0], Ne[1], and Ne[2]. In this case, first, the normal vectors Ne[i] (i=0, 1, 2, 3) are transformed into representations Nh[i] according to the view coordinate system. In other words, the products Nh[i] between the transpose of the inverse matrix of the coordinate transformation matrix Mv included in the right-view camera parameters and the respective normal vectors Ne[i] are obtained: $Nh[i]=Mv^{-T}*Ne[i]$. After that, an average value $N[0]$ of those normal vectors Nh[i] are obtained by the following equation: $N[0]=\text{Normalize}\{(Nh[0]+Nh[1]+Nh[2])/3\}$. Here, the operator "+" produces a vector sum, and the operator "/" produces quotients of the vector components. The length of the normal vector $N[0]$ equals 1.

Note that any method other than the above two methods may be used for calculating the normal vectors of the polygons. For example, one of the normal vectors Nh[i] obtained in the same way as the second method may be selected as the normal vector $N[0]$ of the polygon P0.

[Evaluation of Object Surface Curvature]

In the step S32 shown in FIG. 7, the object surface curvature is evaluated using either (1) angles formed between normal vectors of every two adjacent polygons or (2) the maximum component values among all normal vector components defining the polygons.

(1) When the object surface curvature is evaluated by using angles formed between normal vectors of every two adjacent polygons, a calculation order of angles is determined in accordance with the representational form of the polygons constituting the object surface.

Figure 8A:
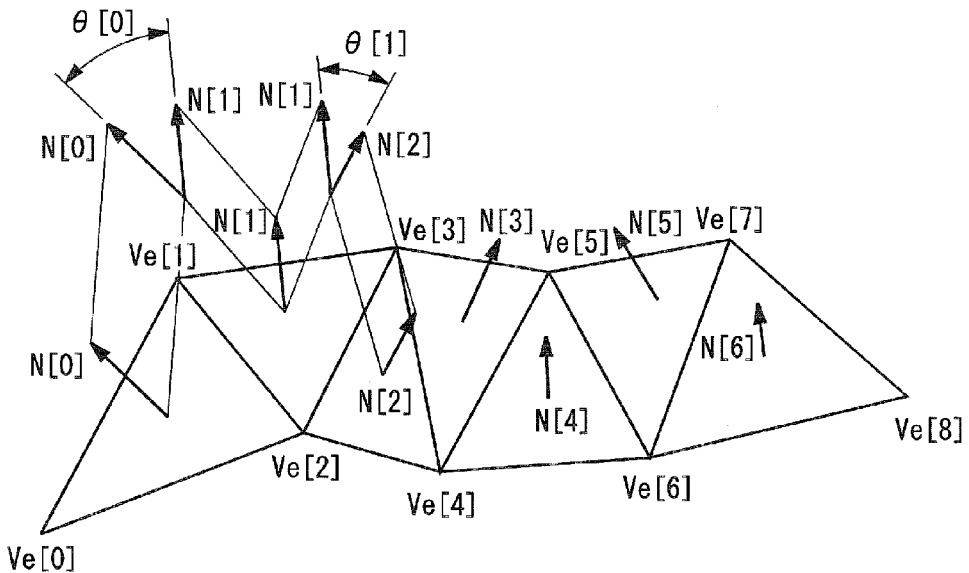
FIG. 8A is a schematic diagram of normal vectors when the polygons are represented by a triangular strip as shown in FIG. 4A.

FIG. 8A is a schematic diagram showing the case in which the polygons are represented by the triangular strip as shown in FIG. 4A. In this case, first, an angle $\theta[0]$ formed between the normal vector $N[0]$ of the first polygon and the normal vector $N[1]$ of the second polygon is calculated by the following equation: $\theta[0]=\arccos(N[0]\cdot N[1]/|N[0]||N[1]|)$. Here the operator "·" produces an inner product of the vectors.

Secondly, an angle θ[1] formed between the normal vector N[1] of the second polygon and the normal vector N[2] of the third polygon is calculated by the following equation: θ[1]=arccos (N[1]·N[2]/|N[1]||N[2]|). After that, angles θN formed between normal vectors N[i] and N[i+1] defining other two adjacent polygons are calculated (i=0, 1, 2, ..., P-2). Here, the letter P represents a total number of polygons constituting the triangular strip. Subsequently, an average value of the angles θ[i] formed between the normal vectors is decided as a curvature C of the object surface represented by the triangular strip: C=(θ[0]+θ[1]+ ... +θ[P-2])/(P-2). Alternatively, the maximum value among the angles θ[i] may be decided as the object surface curvature C: C=max (θ[0], θ[1], ... θ[P-2]).

Figure 8B:
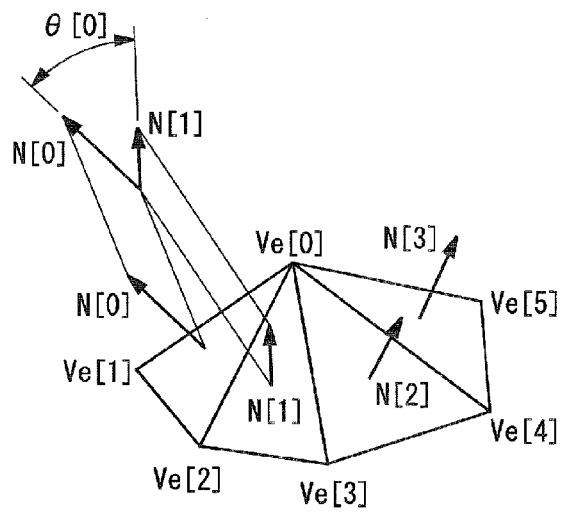
FIG. 8B is a schematic diagram of the normal vectors when the polygons are represented by a triangular fan as shown in FIG. 4B.

FIG. 8B is a schematic diagram showing the case in which the polygons are represented by the triangular fan as shown in FIG. 4B. In this case, first, an angle θ[0] formed between the normal vector N[0] of the first polygon and the normal vector N[1] of the second polygon is calculated by the following equation: θ[0]=arccos (N[0]·N[1]/|N[0]||N[1]|). After that, angles θ[i] formed between normal vectors N[i] and N[i+1] defining other two adjacent polygons are calculated (i=0, 1, 2, ..., P-2). Here, the letter P represents a total number of polygons constituting the triangular fan. When the triangular fan is open, there are (P-1) kinds of the angles θ[i]. When the triangular fan is closed, there are P kinds of the angles θ[i]. Subsequently, an average value of the angles θ[i] formed between the normal vectors is decided as a curvature C of the object surface represented as the triangular strip: C=(θ[0]+θ[1]+ ... +θ[Q])/Q (Q=P-2, or P-1). Alternatively, the maximum value among the angles θ[i] may be decided as the object surface curvature C: C=max (θ[0], θ[1], ... θ[Q]).

Figure 8C:
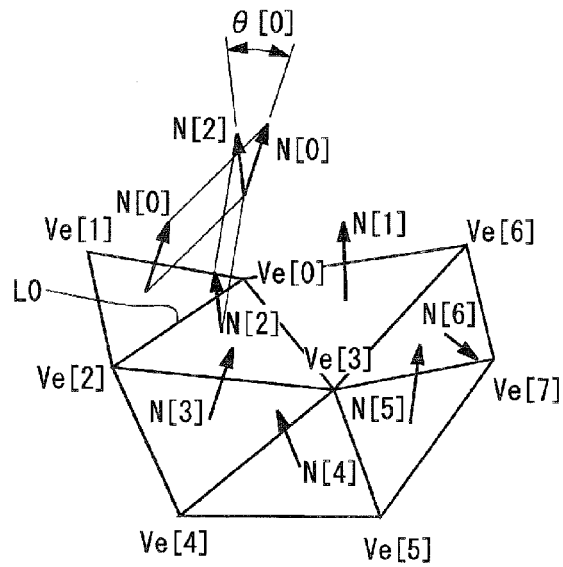
FIG. 8C is a schematic diagram of the normal vectors when the polygons are represented by a triangular mesh as shown in FIG. 4C.

FIG. 8C is a schematic diagram showing the case in which the polygons are represented by a triangular mesh as shown in FIG. 4C. In this case, the determination unit 161A first creates a polygon buffer in the memory unit 161B by referring to the 3D data of the object.

The "polygon buffer" is a correspondence table defining, for each polygon, a set of indexes in correspondence with the normal vector. FIG. 9 shows an exemplary polygon buffer. Referring to FIG. 9, the polygons are each assigned with a serial number 0, 1, 2, ..., P-1 as a unique ID. Here, the letter P represents a total number of polygons constituting the object surface. For each polygon ID, one set of indexes of the vertices contained in the polygon and one normal vector defining the polygon are stored in correspondence with each other. For example, a set of index (0, 1, 2) and a normal vector N[0]=(N[0]x, N[0]y, N[0]z) correspond to the polygon ID=0. For another example, a set of index (0, 3, 6) and a normal vector N[1]=(N[1]x, N[1]y, N[1]z) correspond to the polygon ID=1.

The determination unit 161A then selects from the polygon buffer one of the sets of indexes, and searches the polygon buffer for another set of indexes including any two of the three indexes constituting the selected set of indexes. For example, when the set of indexes (0, 1, 2) of the polygon ID=0 is selected, the set of indexes (0, 2, 3) of the polygon ID=2 is retrieved. These two sets of indexes contain overlapping indexes of "0" and "2". Referring to FIG. 8C, the overlapping indexes indicate the following: the polygon P0 with the polygon ID=0 and the polygon P1 with the polygon ID=1 share the side L0 joining the first vertex Ve[0] and the third vertex Ve[2].

Subsequently, the determination unit 161A searches the polygon buffer for the normal vectors corresponding to the retrieved sets of index, and calculates an angle formed between the normal vectors. As an example of FIG. 8C and FIG. 9, an angle θ[0] formed between the normal vector N[0]=(N[0]x, N[0]y, N[0]z) and the normal vector N[2]=(N[2]x, N[2]y, N[2]z), which respectively correspond to the polygons IDs=0 and 2, is obtained: θ[0]=arccos(N[0]·N[2]/|N[0]||N[2]|).

After that, upon each selection of a set of indexes from the polygon buffer, a polygon is similarly retrieved that shares a side with the polygon corresponding to the vertex of the selected set, and angles θ[k] (k=0, 1, 2, ..., M-1) formed between the normal vectors of these polygons are calculated (where the letter M represents a total number of the angles θ[k]). Subsequently, the determination unit 161A decides the average or the maximum value of the angles θ[k] as the object surface curvature C.

(2) When the determination unit 161A evaluates the object surface curvature using the maximum component values in all normal vector components defining the respective polygons, the determination unit 161A selects one of the normal vectors calculated in the step S31 and decides the x-coordinate component of the selected normal vector as the maximum value maxNx. Subsequently, the determination unit 161A selects another normal vector, and compares the x-coordinate component Nx of the other normal vector with the maximum value maxNx. When the x-coordinate component Nx is greater than the maximum value maxNx, the determination unit 161A replaces the maximum value maxNx with the x-coordinate component Nx. The above processing is repeatedly performed for all the normal vectors of the respective polygons constituting the object surface. As a result, the true maximum value among all the x-coordinate components is obtained. Similarly, the maximum value maxNy among all the y-coordinate components of all the normal vectors and the maximum value maxNz among all the z-coordinate components of all the normal vectors are obtained. Subsequently, the determination unit 161A decides the length |Nmax|=sqrt (maxNx$^2$+maxNy$^2$+maxNz$^2$) of a vector Nmax=(maxNx, maxNy, maxNz) having the above maximum values for the respective coordinates as the object surface curvature C.

[Generation of Left-View Frame]

Figure 10:
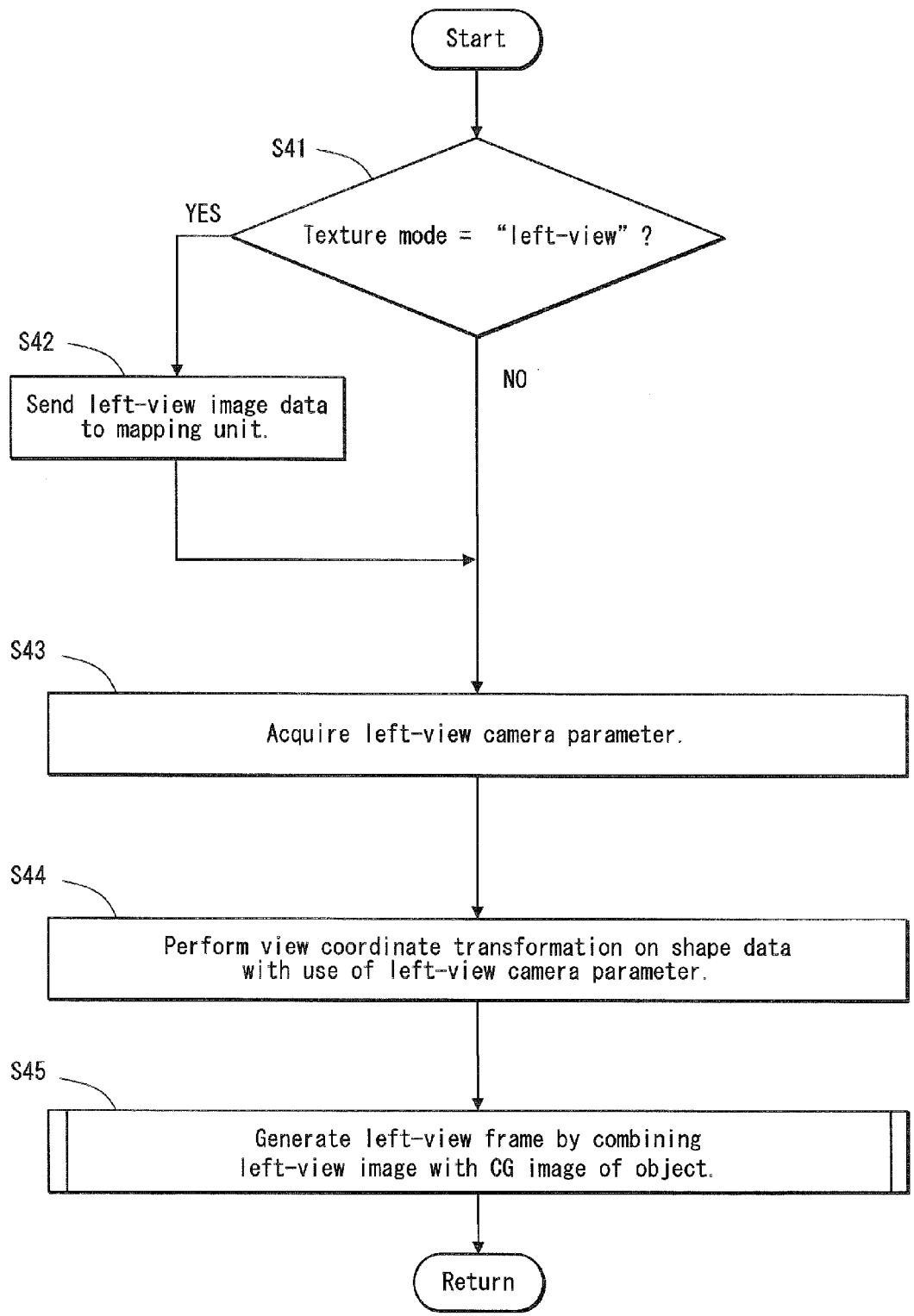
FIG. 10 is a flowchart of step S12 shown in FIG. 3.

FIG. 10 is a flowchart of the step S12 shown in FIG. 3. In the step S12, the display device 10 generates the left-view frame as follows.

In step S41, the control unit 161 reads from the memory unit 161B the texture mode, and determines whether the texture mode is set to "left-view". When the texture mode is set to "left-view", the processing moves to step S42. When the texture mode is not set to "left-view", the processing moves to step S43.

In the step S42, since the texture mode is set to "left-view", the left-view still/moving picture should be mapped to the left-view CG image of the object. Accordingly, the control unit 161 extracts the left-view image data from the image data received from the input units 100 to 130, and transmits the extracted left-view image data to the mapping unit 162A. Subsequently, the processing moves to the step S43.

In the step S43, the control unit 161 extracts the left-view camera parameters from the image data and stores the extracted left-view camera parameters in the memory unit 161B. Subsequently, the processing moves to the step S44.

In the step S44, the control unit 161 causes the rendering unit 162 to perform, by using the left-view camera parameters, view coordinate transformation on the shape data of the object. Subsequently, the processing moves to the step S45.

In the step S45, the control unit 161 causes the mapping unit 162A to use the shape data represented by the view coordinate values to map the still/moving picture to the CG image of the object. When the texture mode is set to "left-view", as described in the step S42, the left-view image data is used for the mapping processing. On the other hand, when the texture mode is set to "right-view", the left-view image is not transmitted to the mapping unit 162A, and the existing right-view image data is used for the mapping processing. Details of the mapping processing will be described later. In this way, when the texture mode is set to "left-view", the left-view still/moving picture is combined with the CG image of the object, and when the texture mode is set to "right-view", the right-view still/moving picture is combined with the CG image of the object. The combined image is transmitted as the left-view frame.

[Detail of Mapping Processing]

Figure 11:
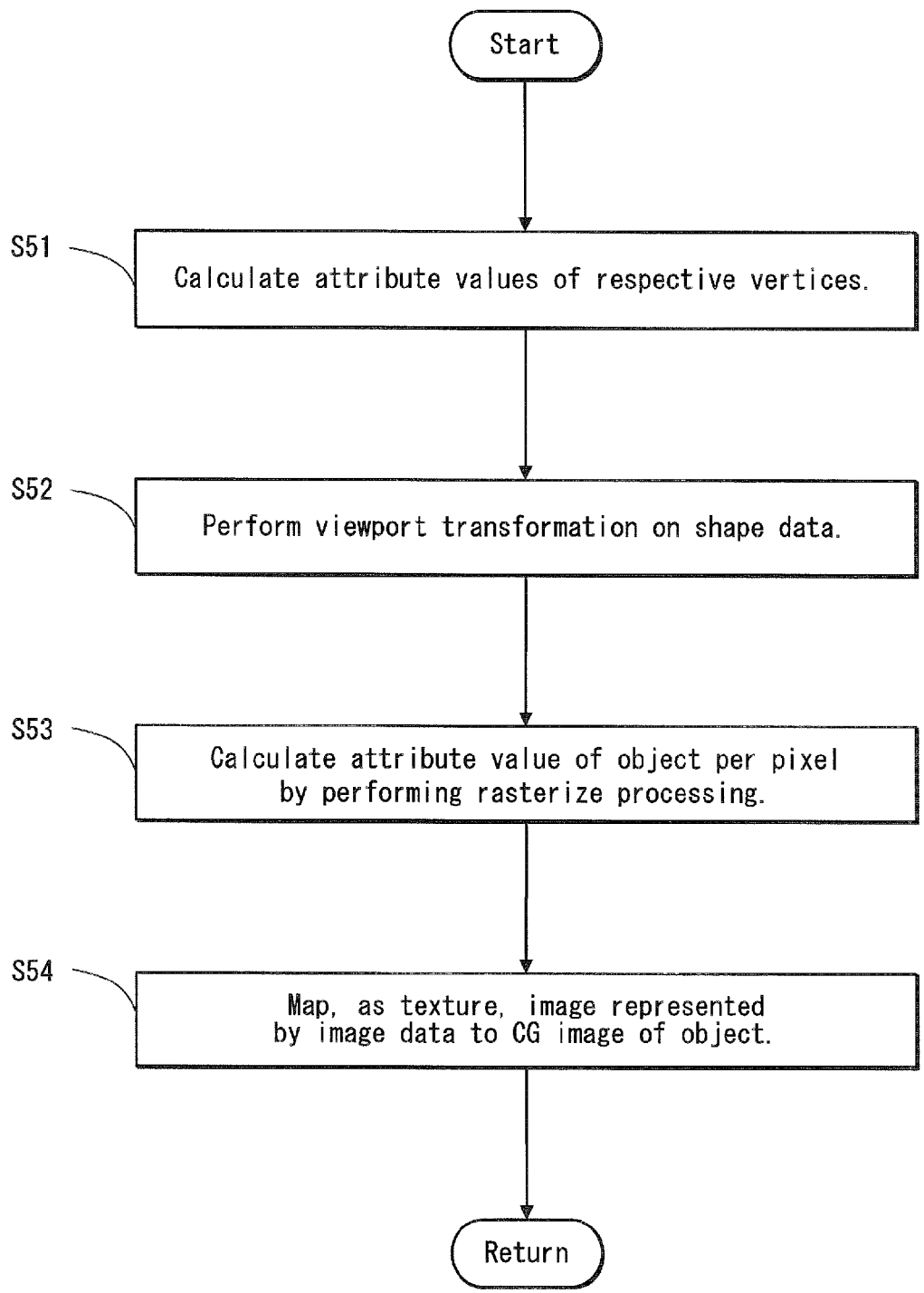
FIG. 11 is a flowchart of step S27 shown in FIG. 5 and step S45 shown in FIG. 3.

FIG. 11 is a flowchart of the step S27 shown in FIG. 5 and the step S45 shown in FIG. 10. The data processed in the step S27 differs from that in the step S45. However, the particular processing performed in both the steps is identical.

In the step S51, the rendering unit 162 performs processing on the vertices of the polygons constituting the object by means of the vertex shader 222A, and calculates the attribute values of the respective vertices. Each attribute value includes, for example, a brightness and a color coordinate value. For calculation of the brightness, in particular, the Lambert model, the Phong model, or an original shading model described by the vertex shader 222A are employed. Subsequently, the processing moves to step S52.

In the step S52, the rendering unit 162 performs viewport transformation on the shape data of the object by means of the vertex shader 222A. The "viewport" denotes an area within a window displayed on the screen of the display panel 172 in which an image is actually displayed. The "viewport transformation" is processing of obtaining CG images of an object projected to the 2D plane, and transforming the obtained CG images into an image to be displayed in the viewport. Any well-known method in the field of 3DCG may be used for the viewport transformation, and as an example, a method defined by OpenGL is used. The rendering unit 162 further calculates a slope parameter of the shape data on which the viewport transformation has been performed. The "slope parameter" represents slopes of lines corresponding to the respective sides of polygons contained in the CG image of the object to be displayed in the viewport. Subsequently, the processing moves to step S53.

In the step S53, the rendering unit 162 causes the pixel shader 222B to perform rasterize processing on the shape data by using the attribute values of the vertices calculated in the step S51, as well as the shape data and the slope parameter calculated in the step S52. In other words, the rendering unit 162 calculates color information (pixel data) per pixel within the viewport and expresses the CG image of the object to be displayed in the viewport as raster data. Any well-known method in the field of 3DCG may be used for the rasterize processing, and as an example, DDA (Digital Differential Analyzer) is used. The obtained raster data is written into the frame buffer 162B. Subsequently, the processing moves to step S54.

In the step S54, the rendering unit 162 causes the pixel shader 222B to map, as the texture, the image data transferred from the memory unit 161B to the CG image of the object. Any well-known method in the field of 3DCG may be used for the texture mapping. For example, the rendering unit 162 first obtains a texture coordinate for each pixel in which the pixel data is written in the step S53. Next, the rendering unit 162 combines a portion of the image data defined by the texture coordinate of a piece of pixel data with the pixel data. Any well-known method in the field of 3DCG may be used for the combining processing, and as an example, a method defined by OpenGL is used. The combined pixel data is written into the frame buffer 162B. The above combining processing is repeatedly performed for all pieces of pixel data that have been written into the frame buffer 162B in the step S53. Thus, raster data representing the combined image, that is, the image represented by the image data mapped to the CG image of the object, is generated in the frame buffer 162B as the right-view or the left-view frame.

Advantageous Effects of First Embodiment

Figure 12A:
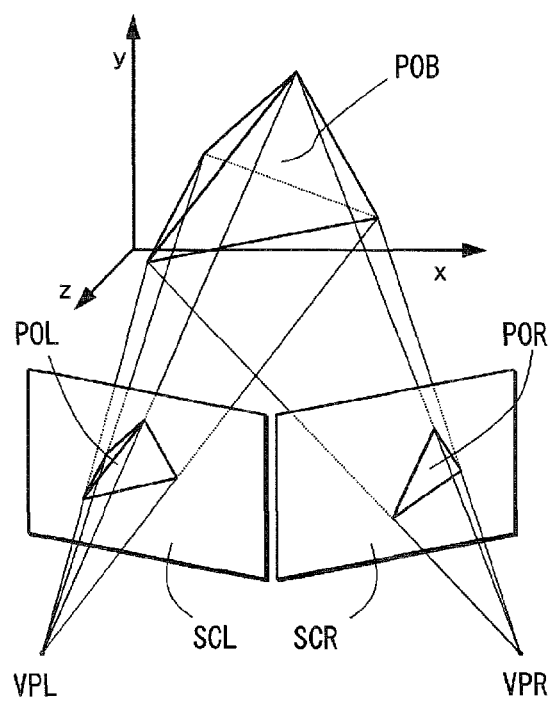
FIG. 12A is a schematic diagram of CG images for an object POB having a substantially flat surface.

FIG. 12A is a schematic diagram of CG images for an object POB having a substantially flat surface. Referring to FIG. 12A, there is shown as the object POB a triangular pyramid residing in 3D virtual space whose sides are flat triangules. As already described, the monoscopic CG image POR, which represents the triangular pyramid POB projected onto the right-view 2D screen SCR, is calculated from the right-view camera parameters corresponding to the viewpoint VPR of the viewer's right eye. On the other hand, the monoscopic CG image POL, which represents the triangular pyramid POB projected onto the left-view 2D screen SCL, is calculated from the left-view camera parameters corresponding to the viewpoint VPL of the viewer's left eye.

Figure 12B:
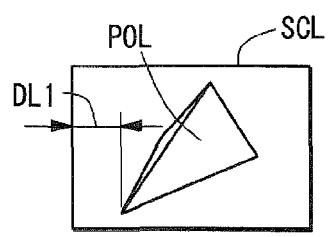
FIG. 12B shows a left-view monoscopic CG image POL for the object POB.
Figure 12C:
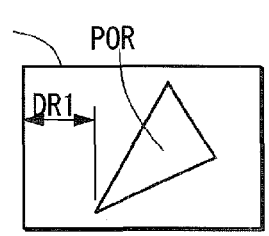
FIG. 12C shows a right-view monoscopic CG image POR for the object POB.

FIG. 12B shows the left-view monoscopic CG image POL of the triangular pyramid POB, and FIG. 12C shows the right-view monoscopic CG image POR of the triangular pyramid POB. Here, it is assumed that the triangular pyramid POB has a depth behind the screen. In this case, as shown in FIG. 12B and FIG. 12C, the distance DL1 between the left-view CG image POL and the left-hand side of the screen SCL is smaller than the distance DR1 between the right-view CG image POR and the left-hand side of the screen SCR.

Figure 12D:
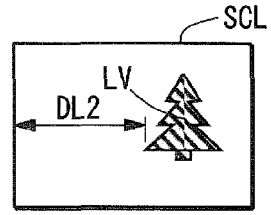
FIG. 12D shows a left-view monoscopic image constituting a frame of a stereoscopic still/moving picture to be mapped to the surface of the object POB.
Figure 12E:
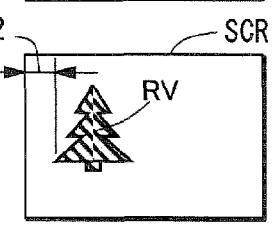
FIG. 12E shows a right-view monoscopic image constituting the frame.

FIG. 12D shows a left-view monoscopic image constituting a frame of the stereoscopic still/moving picture to be mapped to the surface of the object POB, and FIG. 12E shows a right-view monoscopic image constituting the frame. Here, suppose that the stereoscopic image of a "tree" in the frame has a depth in front of the screen. In this case, as shown in FIG. 12E and FIG. 12E, the distance DL2 between a left-view "tree" image LV and the left-hand side of the screen SCL is greater than the distance DR2 between a right-view "tree" image RV and the left-hand side of the screen SCR.

Since the surfaces of the triangular pyramid POB are substantially flat, the angles θ[k] formed by normal vectors of two adjacent polygons as shown in FIG. 8 are all sufficiently small (k=0, 1, 2, . . . ). Accordingly, the surface curvature of the triangular pyramid POB is lower than the threshold, and therefore the texture mode is set to "left-view" in the step S25 shown in FIG. 5. As a result, the left-view "tree" image LV shown in FIG. 12D is mapped to the left-view CG image POL of the triangular pyramid shown in FIG. 12B. The right-view "tree" image RV shown in FIG. 12E is mapped to the right-view CG image POR of the triangular pyramid shown in FIG. 12C.

Figure 12F:
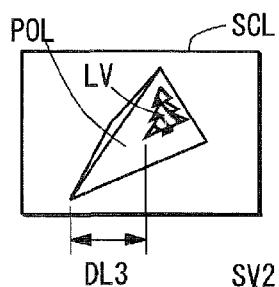
FIG. 12F shows a combined image of the left-view CG image POL and a left-view "tree" image LV.
Figure 12G:
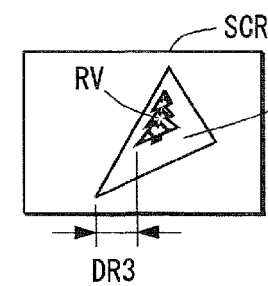
FIG. 12G shows a combined image of the right-view CG image POR and a right-view "tree" image RV.
Figure 12H:
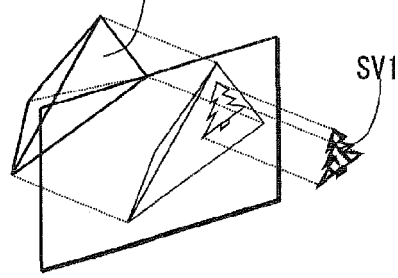
FIG. 12H is a schematic diagram showing a stereoscopic image perceived by a viewer observing the combined images shown in FIG. 12F and FIG. 12G with the left eye and right eye, respectively.

FIG. 12F shows a combined image of the left-view CG image POL of the triangular pyramid and the left-view "tree" image LV. FIG. 12G shows a combined image of the right-view CG image POR of the triangular pyramid and the right-view "tree" image RV. As shown in FIG. 12F and FIG. 12G, the distance DL3 between the left-hand side of the left-view CG image POL and the left-view image LV is greater than the distance DR3 between the left-hand side of the right-view POR and the right-view image RV. FIG. 12H is a schematic diagram showing a stereoscopic image perceived by the viewer observing the combined images shown in FIG. 12F and FIG. 12G with the left eye and right eye, respectively. As shown in FIG. 12H, a stereoscopic "tree" image SV1 appears to jump out from the stereoscopic image SV2 of the triangular pyramid towards the viewer.

Figure 13A:
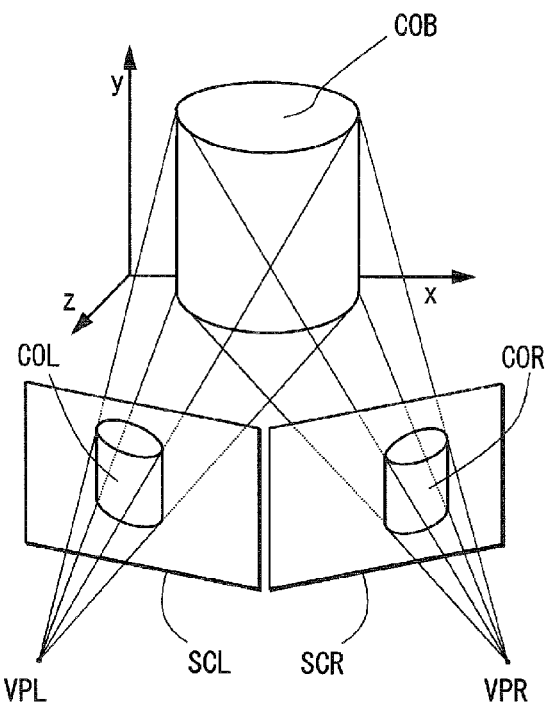
FIG. 13A is schematic diagram of CG images for an object COB having a substantially curved surface.

FIG. 13A is a schematic diagram of CG images for an object having a substantially curved surface. Referring to FIG. 13A, there is shown as an object COB an elliptical column residing in 3D virtual space whose circumferential surface is significantly curved. As already described, the monoscopic CG image COR, which represents the elliptical column COB projected onto the right-view 2D screen SCR, is calculated from the right-view camera parameters corresponding to the viewpoint VPR of the viewer's right eye. On the other hand, the monoscopic CG image POL, which represents the elliptical column COB projected onto the left-view 2D screen SCL, is calculated from the left-view camera parameters corresponding to the viewpoint VPL of the viewer's left eye.

Figure 13B:
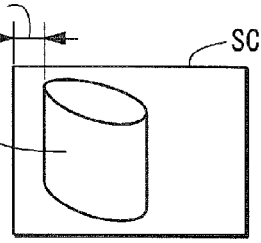
FIG. 13B shows a left-view monoscopic CG image COL for the object COB.
Figure 13C:
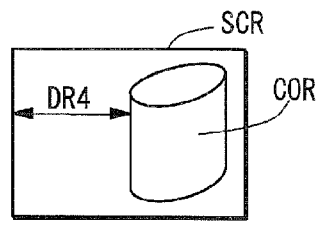
FIG. 13C shows a right-view monoscopic CG image COR for the object COB.

FIG. 13B shows the left-view monoscopic CG image COL of the elliptical column COB, and FIG. 13C shows the right-view monoscopic CG image COR of the elliptical column COB. Here, it is assumed that the elliptical column COB has a depth behind the screen. In this case, as shown in FIG. 13B and FIG. 13C, the distance DL4 between the left-view CG image COL and the left-hand side of the screen SCL is smaller than the distance DR4 between the right-view CG image POR and the left-hand side of the screen SCR.

Figure 13D:
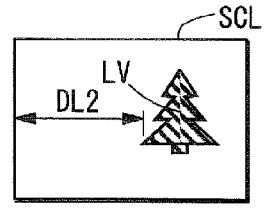
FIG. 13D shows the left-view monoscopic image constituting the frame of the stereoscopic still/moving picture to be mapped to the surface of the object COB.
Figure 13E:
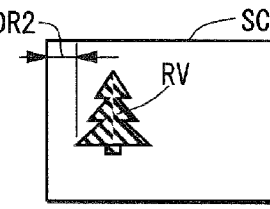
FIG. 13E shows the right-view monoscopic image constituting the frame.

FIG. 13D shows the left-view monoscopic image constituting a frame of the stereoscopic still/moving picture to be mapped to the surface of the elliptical column COB, and FIG. 13E shows the right-view monoscopic image constituting the frame. Here, suppose that the stereoscopic "tree" image of in the frame has a depth in front of the screen. In this case, as shown in FIG. 13D and FIG. 13E, the distance DL2 between the left-view "tree" image LV and the left-hand side of the screen SCL is greater than the distance DR2 between the right-view "tree" image RV and the left-hand side of the screen SCR.

Since the surface of the elliptical column COB is substantially curved, at least one of the angles θ[k] formed by normal vectors of two adjacent polygons as shown in FIG. 8 is sufficiently large (k=0, 1, 2, . . . ). Accordingly, the surface curvature of the elliptical column COB is greater than the threshold, and therefore the texture mode is set to "right-view" in the step S25 shown in FIG. 5. As a result, the right-view "tree" image RV shown in FIG. 13E is mapped to both the left-view CG image COL of the elliptical column shown in FIG. 13B and the right-view CG image COR of the elliptical column shown in FIG. 13C.

Figure 13F:
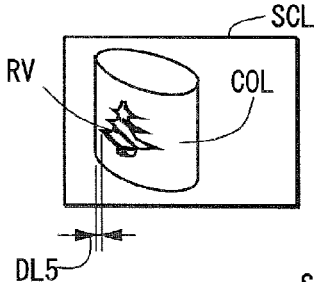
FIG. 13F shows a combined image of the left-view CG image COL and the left-view "tree" image LV.
Figure 13G:
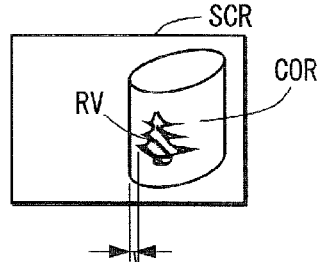
FIG. 13G shows a combined image of the right-view CG image COR and the right-view "tree" image RV.
Figure 13H:
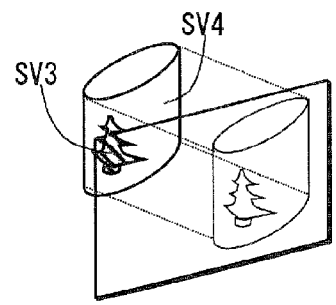
FIG. 13H is a schematic diagram showing a stereoscopic image perceived by a viewer seeing the combined images shown in FIG. 13F and FIG. 13G respectively with the left eye and right eye.

FIG. 13F shows a combined image of the left-view CG image COL of the elliptical column and the right-view "tree" image RV, and FIG. 13G shows a combined image of the right-view CG image COR of the elliptical column and the right-view "tree" image RV. As shown in FIG. 13F and FIG. 13G, the distance DL5 between the left-hand side of the left-view CG image COL and the right-view image RV is substantially equal to the distance DR5 between the left-hand side of the right-view CG image COR and the right-view image RV. FIG. 13H is a schematic diagram showing a stereoscopic image perceived by the viewer observing the combined images shown in FIG. 13F and FIG. 13G with the left eye and right eye, respectively. As shown in FIG. 13H, the stereoscopic "tree" SV3 appears to be located at the same depth as the stereoscopic image SV4 of the elliptical column, and in particular, appears to be pasted on the surface thereof.

As shown in FIGS. 12H and 13H, the display device 10 according to the first embodiment of the present invention maps the still/moving picture to the object surface differently depending on the surface curvature: when the surface curvature is relatively low, the display device 10 maps the stereoscopic image of the still/moving picture, and when the surface curvature is relatively high, the display device 10 maps the (right-view) monoscopic image of the still/moving picture. Consequently, when the object surface is substantially flat, the display device 10 is able to make the still/moving picture appear to float above the surface or to be located behind the surface. On the other hand, when the object has a rough surface or a curved surface which is so curved that the stereoscopic image mapped thereto would not appear to be stereoscopic, the display device 10 causes the rendering unit 162 to process only the right-view still/moving picture. This reduces an amount of loads required for the mapping processing, in particular the loads required for bitBLT from the memory unit 161B to the rendering unit 162, thereby facilitating the processing of combining the still/moving picture with the CG images of the object. As a result, the display device 10 is able to improve the quality of the combined images.

Second Embodiment

The display device according to a second embodiment of the present invention differs from that of the first embodiment in the point that, for the determination about suitability for stereoscopic image mapping in the step S25 shown in FIG. 5, the display device evaluates brightnesses at the vertices of the polygons constituting the object surface, instead of the object surface curvature. Apart from the above point, the display device of the second embodiment has the same structure and the same function as that of the first embodiment. Accordingly, the following section describes some parts of the display device according to the second embodiment; the parts are modified or extended from the first embodiment. Details on the parts of the display device that are the same as those of the first embodiment can be found in the description of the first embodiment.

Figure 14:
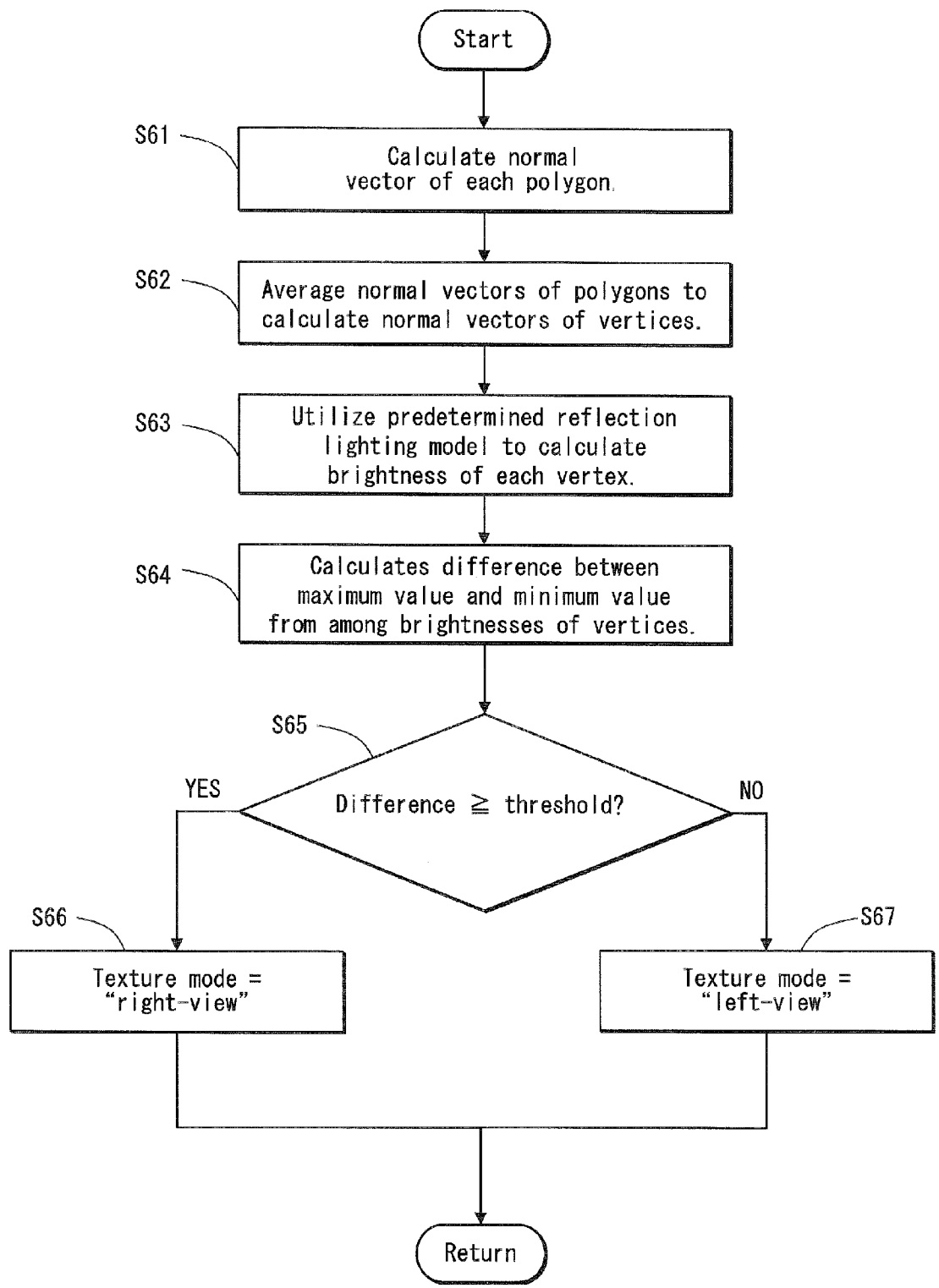
FIG. 14 is a flowchart of the step S25 shown in FIG. 5 that the display device according to a second embodiment of the present invention performs.

FIG. 14 is a flowchart of the step S25 shown in FIG. 5. Unlike in the first embodiment, the determination unit 161A in the second embodiment of the present invention determines the object's suitability for still/moving picture mapping depending on brightnesses at the vertices of the polygons constituting the object surface as follows. For the description below, it is assumed that the normal vectors of the vertices are calculated by the aforementioned first method. Note that steps S61 and S62 are skipped when the normal vectors of the vertices are defined by the 3D data of the object.

In the step S61, the determination unit 161A causes the rendering unit 162 to calculate the normal vectors of the polygons by referring to the 3D data of the object. Next, the processing moves to the step S62.

In the step S62, the determination unit 161A causes the rendering unit 162 to average the normal vectors of the polygons to calculate the normal vectors of the vertices. A specific method for the evaluation will be described later. Subsequently, the processing moves to the step S63.

In the step S63, the determination unit 161A causes the rendering unit 162 to utilize a predetermined reflection lighting model to calculate the brightness of each vertex from the normal vector of the vertex. As the reflection lighting model, the Lambert model or the Phong model is employed. Subsequently, the processing moves to step S64.

In the step S64, the determination unit 161A chooses the maximum value and the minimum value from among the brightnesses of all the vertices, and calculates a difference between these two values. Subsequently, the processing moves to step S65.

In the step S65, the determination unit 161A determines whether or not the difference calculated in the step S64 is equal to or greater than a predetermined threshold by comparing the difference with the predetermined threshold. The threshold herein is stored in the memory unit 161B by the control unit 161 in advance, and represents a difference between the maximum value and the minimum value selected from the brightnesses of all the vertices when the object surface is in one of the following conditions. The first condition is a condition where, providing that the object surface curvature is gradually increased starting from 0, the stereoscopic image mapped to the object surface fails to appear to be stereoscopic. When the surface curvature is sufficiently high, at least one of the vertices of the polygons constituting the surface is hidden behind the surface itself. The difference between the maximum value and the minimum value among the brightnesses of all the vertices can be regarded as a measure of the object surface curvature since the difference indicates the darkness of the shadowed portion in the surface. The second condition is a condition where, providing the object surface is gradually inclined from the position perpendicular to the visual direction, the stereoscopic image mapped to the surface is so inclined that the image fails to appear to be stereoscopic. When the surface is sufficiently inclined, a great difference occurs in brightness between a vertex located in an area close to the viewpoint and a vertex located in an area far from the viewpoint. The difference between the maximum value and the minimum value among the brightnesses of all the vertices can be regarded as a measure of the inclination of the surface since the difference indicates a difference between the distances from the viewpoint to the respective vertexes. When the difference between the maximum value and the minimum value among the brightnesses of all the vertices is equal to or greater than the threshold, the processing moves to step S66. When the difference is less than the threshold, the processing moves to step S67.

In the step S66, the determination unit 161A sets the texture mode to "right-view". Since the difference between the maximum value and the minimum value among the brightnesses of all the vertices is equal to or greater than the threshold, the object surface is significantly curved, or significantly inclined with respect to the visual direction. Accordingly, the stereoscopic image mapped to the object would not appear to be stereoscopic. For this reason, the texture mode is set so that the right-view still/moving picture is to be mapped to the left-view CG image of the object as is the case of the right-view CG image. This texture mode is stored in the memory unit 161B. Subsequently, the processing moves to the step S26 shown in FIG. 5.

In the step S67, the determination unit 161A sets the texture mode to "left-view". Since the difference between the maximum value and the minimum value among the brightnesses of all the vertices is less than the threshold, the stereoscopic image mapped to the object surface properly appears to be stereoscopic. For this reason, the texture mode is set so that the left-view still/moving picture is to be mapped to the left-view CG image of the object. This texture mode is stored in the memory unit 161B. Subsequently, the processing moves to the step S26 shown in FIG. 5.

[Calculation of Normal Vectors of Vertices]

Figure 15A:
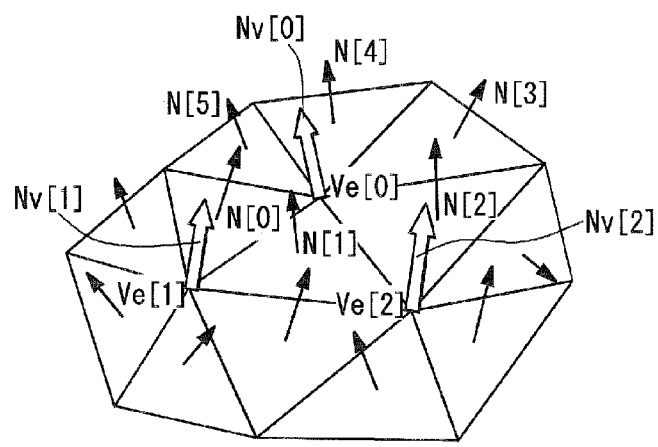
FIG. 15A is a schematic diagram showing normal vectors of polygons and vertices which belong to a triangular mesh constituting a part of surface of an object.

In the step S61 shown in FIG. 14, the normal vectors of the vertices are calculated as follows. FIG. 15A is a schematic diagram showing normal vectors of polygons and vertices which belong to a triangular mesh composing a part of an object surface. First, the rendering unit 162 reads coordinate values of the vertices from 3D data of the object by means of the vertex shader 222A, and calculates normal vectors N[k] of the polygons from the read coordinate values (k=0, 1, 2, ... ). Next, the rendering unit 162 averages normal vectors of polygons sharing each vertex, and determines the averaged normal vector as the normal vector of the vertex. In the example shown in FIG. 15A, the first vertex Ve[0] is shared by six polygons. Accordingly, the average value of the normal vectors N[k] (k=0, 1, 2, ..., 5) of those polygons is determined as the normal vector Nv[0] of the first vertex Ve[0]: Nv[0]= Normalize {(N[0]+N[1]+ ... +N[5])/6}. Similarly, the average value of the normal vectors of polygons sharing the second vertex Ve[1] is determined as the normal vector Nv[1], and the average value of the normal vectors of polygons sharing the third vertex Ve[2] is determined as the normal vector Nv[2].

Advantageous Effects of Second Embodiment

Figure 15B:
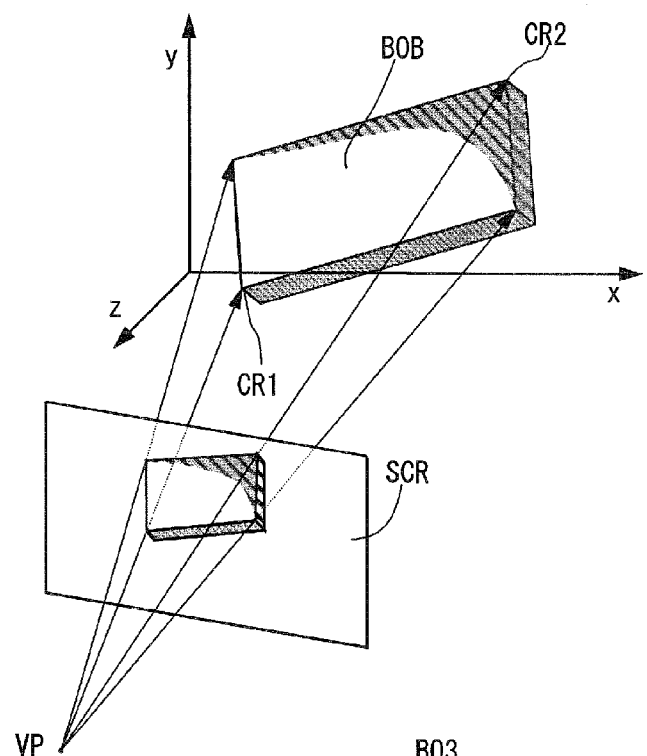
FIG. 15B is a schematic diagram showing a CG image for a plate-like object.

FIG. 15B is a schematic diagram of a CG image for a plate-like object. Referring to FIG. 15B, there is shown an object BOB significantly inclined with respect to the visual direction from the viewpoint VP in 3D virtual space. That is, the surface of the object BOB facing the viewpoint VP is significantly inclined with respect to the projection screen SCR for the viewpoint VP. As a result, on the surface, for example, the brightness is maximum at an angle CR1, which is located closest to the viewpoint VP, and the brightness is minimum at an angle CR2, which is located farthest away from the viewpoint VP. In this way, even when the object surface has a substantially flat shape, if the object is sufficiently inclined with respect to the visual direction, differences occur in brightness among various surface areas. Furthermore, as the inclination increases, such differences generally increase. Accordingly, the inclination of the object surface can be evaluated by the difference between the maximum brightness value and the minimum brightness value.

Figure 15C:
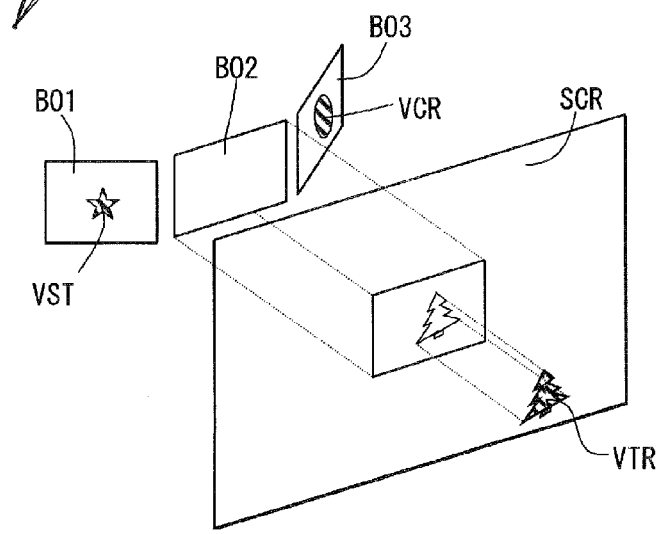
FIG. 15C is a schematic diagram showing stereoscopic CG images BO1, BO2, and BO3 for three plate-like objects, along with stereoscopic images VST, VTR, and VCR respectively mapped to the stereoscopic CG images BO1, BO2, and BO3.

FIG. 15C is a schematic diagram showing stereoscopic CG images BO1, BO2, and BO3 for three plate-like objects, along with stereoscopic images of a "star" VST, a "tree" VTR, and a "circle" VCR respectively mapped to the stereoscopic CG images BO1, BO2, and BO3. As shown in FIG. 15C, the stereoscopic CG image BO1 of the first object and the stereoscopic CG image BO3 of the third object are significantly inclined with respect to the screen SCR. In this case, only the right-view image of the "star" is mapped to the CG image BO1, and only the right-view image of the "circle" is mapped to the CG image BO3. Consequently, the stereoscopic image VST of the "star" appears to be located at the same depth as the stereoscopic object image BO1, and the stereoscopic image VCR of the "circle" appears to be located at the same depth as the stereoscopic object image BO3. In particular, these stereoscopic images VST and VCR appear to be pasted on the surfaces of the images BO1 and BO3, respectively. On the other hand, the stereoscopic CG image BO2 of the second object lies substantially in parallel with the screen SCR. In this case, the right-view "tree" image is mapped to the right-view CG image of the second object, and the left-view "tree" image is mapped to the left-view CG image of the second object. Consequently, as shown in FIG. 15C, the stereoscopic "tree" image VTR appears to jump out from the stereoscopic image BO2 of the second object towards the viewer.

As shown in FIG. 15C, when mapping a still/moving picture to the object surface, the display device according to the second embodiment of the present invention maps the stereoscopic image of the still/moving picture to the surface when there is a relatively small difference in brightness between the vertices of the polygons constituting the surface, and maps a (right-view) monoscopic image of the still/moving picture when there is a relatively large difference in brightness. Consequently, when the object surface is placed substantially parallel to a screen, the display device 10 is able to make the still/moving picture appear to float above the surface or to be located behind the surface. In contrast, when the object surface, although substantially flat, is inclined with respect to the screen, and the stereoscopic image mapped to the surface would not appear to be stereoscopic, the display device only needs to cause the rendering unit 162 to process the right-view still/moving picture. This reduces an amount of loads required for the mapping processing, in particular the loads required for bitBLT from the memory unit 161B to the rendering unit 162, thereby facilitating the processing of combining the still/moving picture with the CG images of the object. As a result, the display device 10 is able to improve the quality of the combined images.

Third Embodiment

The display device according to a third embodiment of the present invention differs from that of the first embodiment in the point that, for the determination about suitability for stereoscopic image mapping in the step S25 shown in FIG. 5, the display device evaluates motion of the object's center of mass, instead of the object surface curvature. Apart from the above point, the display device of the third embodiment has the same structure and the same function as that of the first embodiment. Accordingly, the following section describes some parts of the display device according to the third embodiment; the parts are modified or extended from the first embodiment. Details on the parts of the display device that are the same as those of the first embodiment can be found in the description of the first embodiment.

Figure 16:
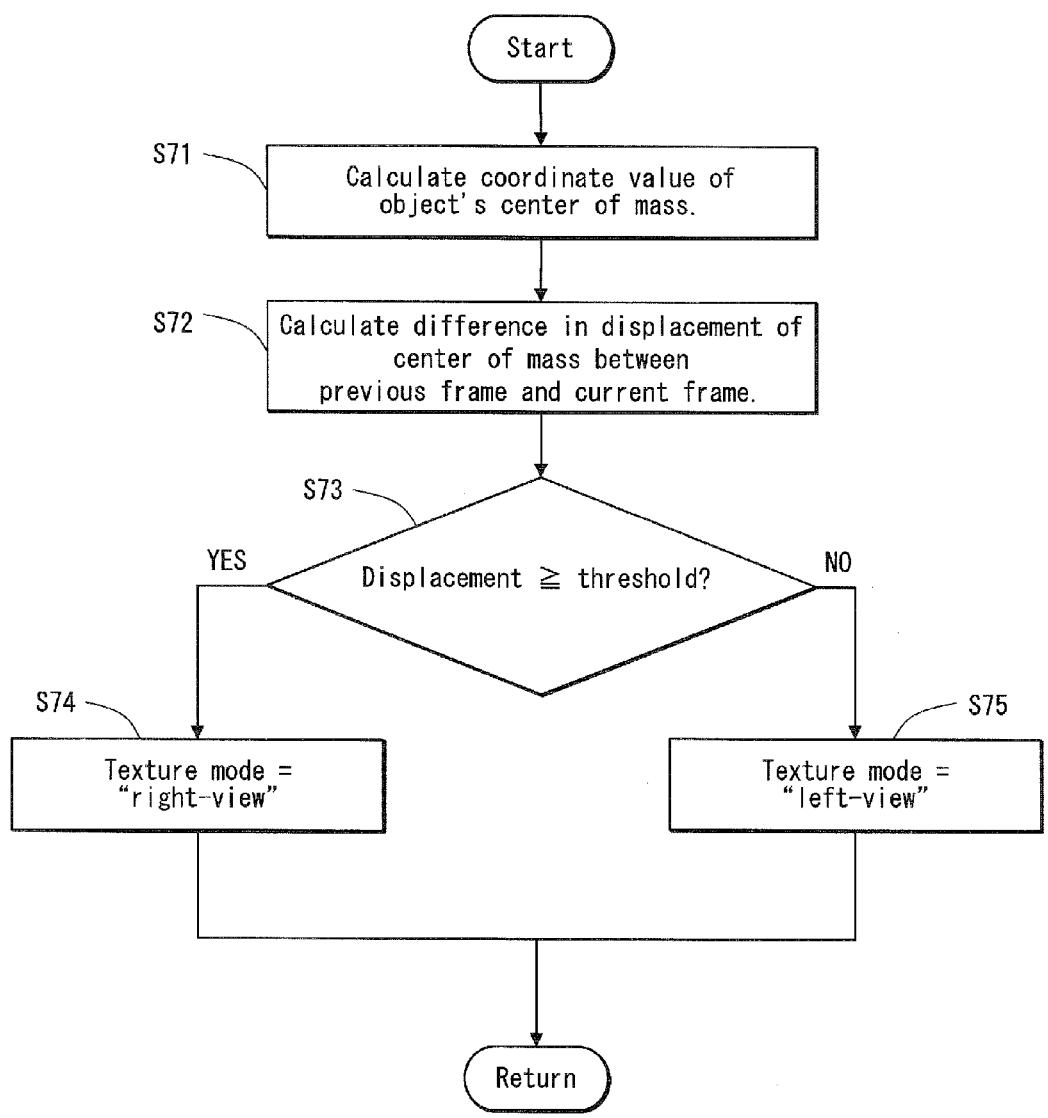
FIG. 16 is a flowchart of the step S25 shown in FIG. 5 that the display device according to a third embodiment of the present invention performs.

FIG. 16 is a flowchart of the step S25 shown in FIG. 5. Unlike in the first embodiment, the determination unit 161A in the third embodiment of the present invention determines the object's suitability for still/moving picture mapping depending on a displacement of the object's center of mass between two consecutive frames as follows.

In step S71, the determination unit 161A causes the rendering unit 162 to refer to the 3D data of the object to calculate a coordinate value VG1 of the object's center of mass in a current frame from coordinate values $(x[i], y[i], z[i])^T$ of the vertices Ve[i] (i=0, 1, 2, ..., NV-1, where the letters NV represent a total number of the vertices) included in the current frame: $VG1=(x[0]+x[1]+x[2]+...+x[NV-1], y[0]+y[1]+y[2]+...+y[NV-1], z[0]+z[1]+z[2]+...+z[NV-1])^T/NV$. Thus obtained coordinate value of the center of mass is stored in the memory unit 161B. Subsequently, the processing moves to step S72.

In the step S72, the determination unit 161A first reads from the memory unit 161B a coordinate value VG0 of the object's center of mass in a frame immediately before the current frame. Next, the determination unit 161A calculates a difference |VG1-VG0| between the coordinate value VG0 so read and the coordinate value VG1 calculated in the step S71. The difference indicates the displacement of the object's center of mass between the previous frame and the current frame. Subsequently, the processing moves to step S73.

In the step S73, the determination unit 161A determines whether or not the displacement |VG1-VG0| calculated in the step S72 is equal to or greater than a predetermined threshold by comparing the displacement with the predetermined threshold. The threshold herein is stored in the memory unit 161B by the control unit 161 in advance. The threshold represents a displacement of the object's center of mass per frame, i.e. a velocity of the object's center of mass, when a stereoscopic image mapped to the object surface fails to appear to be stereoscopic. When the displacement |VG1-VG0| calculated in the step S72 is equal to or greater than the threshold, the processing moves to step S74. When the displacement |VG1-VG0| calculated in the step S72 is less than the threshold, the processing moves to step S75.

In the step S74, the determination unit 161A sets the texture mode to "right-view". Since the velocity of the object's center of mass is equal to or greater than the threshold, the motion of the object's surface would be too fast to make a stereoscopic image mapped to the surface appear stereoscopic. For this reason, the texture mode is set so that the right-view still/moving picture is to be mapped to the left-view CG image of the object as is the case of the right-view CG image. This texture mode is stored in the memory unit 161B. Subsequently, the processing moves to the step S26 shown in FIG. 5.

In the step S75, the determination unit 161A sets the texture mode to "left-view". Since the velocity of the object's center of mass is less than the threshold, the stereoscopic image mapped to the object surface properly appears to be stereoscopic. For this reason, the texture mode is set so that the left-view still/moving picture is to be mapped to the left-view CG image of the object. This texture mode is stored in the memory unit 161B. Subsequently, the processing moves to the step S26 shown in FIG. 5.

Advantageous Effects of Third Embodiment

Figure 17A:
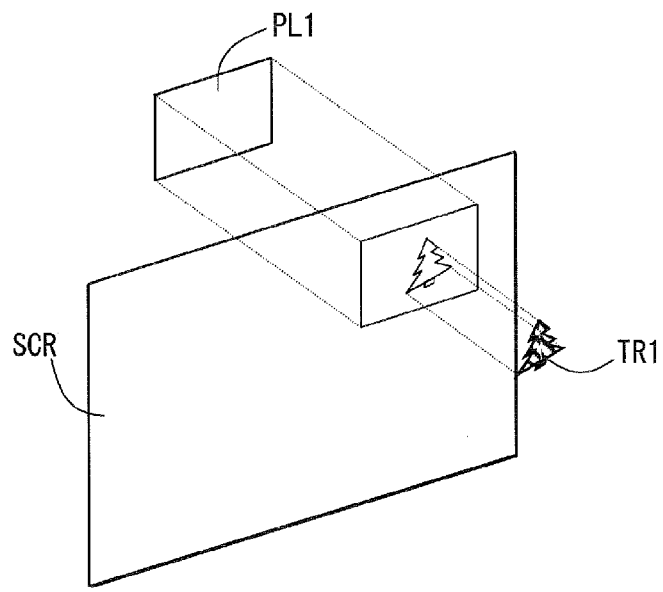
FIG. 17A is a schematic diagram showing a stereoscopic CG image PL1 for a plate-like object, along with a stereoscopic "tree" image TR1 mapped thereto.

FIG. 17A is a schematic diagram showing a stereoscopic CG image PL1 for a plate-like object, along with a stereoscopic "tree" image TR1 mapped thereto. The object's stereoscopic CG mage PL1 remains stationary with respect to the screen SCR. In this case, the center of mass of the object's stereoscopic CG mage PL1 is not displaced in two consecutive frames. Accordingly, the right-view "tree" image is mapped to the right-view CG image of the object, and the left-view "tree" image is mapped to the left-view CG image of the object. Consequently, as shown in FIG. 17A, the stereoscopic "tree" image VTR appears to jump out from the object's stereoscopic image PL1 towards the viewer.

Figure 17B:
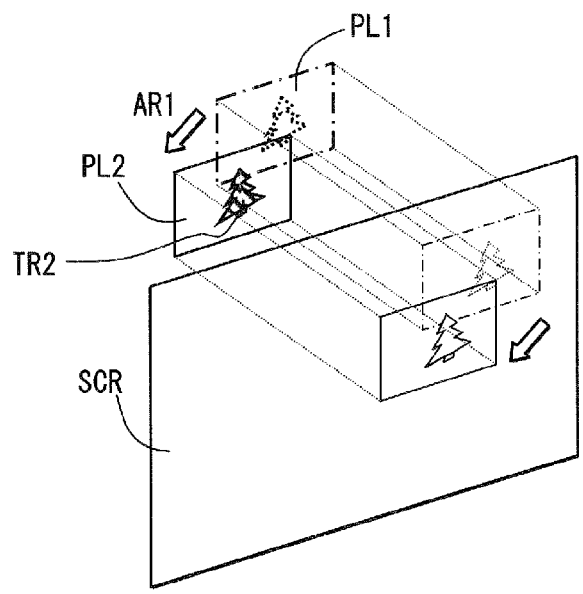
FIG. 17B is a schematic diagram showing a stereoscopic CG image PL2 for the plate-like object in a frame next to the frame shown in FIG. 17A, along with a stereoscopic "tree" image TR2.

FIG. 17B is a schematic diagram showing a stereoscopic CG image PL2 for the object in a frame next to the frame shown in FIG. 17A, along with a stereoscopic "tree" image TR2. As indicated by an arrow AR1 in FIG. 17B, the center of mass of the object's stereoscopic CG image PL2 has been significantly displaced compared with the center of mass of the object's stereoscopic CG image PL1 in the previous frame. In this case, only the right-view "tree" image is mapped to both the left-view CG image and the right-view CG image of the object. Consequently, the stereoscopic "tree" image TR2 appears to be located at the same depth as the object's stereoscopic CG image PL2, and in particular, appears to be pasted on the surface thereof. Similarly, during a period when the center of mass of the object's stereoscopic CG image is displaced upon each switching of a frame, only the right-view "tree" image is continuously mapped to the stereoscopic CG images. Consequently, during the period, the stereoscopic "tree" image appears to be pasted on the object's stereoscopic CG image and move together with the stereoscopic CG images.

Figure 17C:
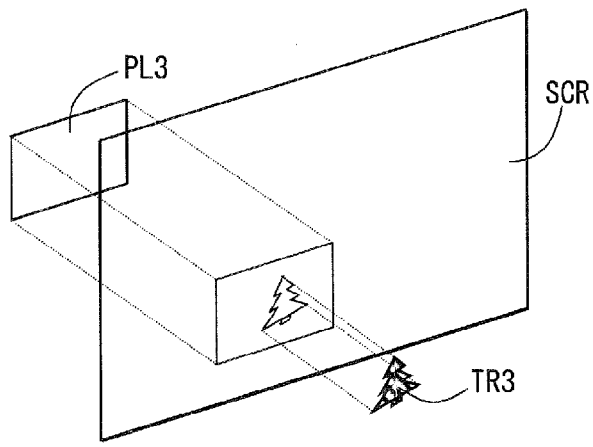
FIG. 17C is a schematic diagram showing a stereoscopic CG image PL3 for the plate-like object in a frame that is several frames after the frame shown in FIG. 17B, along with a stereoscopic "tree" image TR3.

FIG. 17C is a schematic diagram showing a stereoscopic CG image PL3 of the object and a stereoscopic "tree" image TR3 in a frame that is placed after several frames starting from the frame shown in FIG. 17B. Again, the object's stereoscopic CG image PL3 remains stationary with respect to the screen SCR. In this case, the center of mass of the object's stereoscopic CG image PL3 is not displaced in two consecutive frames. Accordingly, the right-view "tree" image is mapped to the right-view CG image of the object, and the left-view "tree" image is mapped to the left-view CG image of the object. Consequently, as shown in FIG. 17C, the stereoscopic "tree" image TR3 appears to jump out from the object's stereoscopic image PL3 towards the viewer.

As shown in FIGS. 17A to 17C, when mapping a still/moving picture to the object surface, the display device according to the third embodiment of the present invention maps a stereoscopic image of the still/moving picture to the surface when relatively small displacement occurs in the object's center of mass between two consecutive frames, and maps a (right-view) monoscopic image of the still/moving picture when relatively large displacement occurs in the object's center of mass between two consecutive frames. Consequently, when the motion of the object is relatively slow, the display device 10 is able to make the still/moving picture appear to float above the surface or to be located behind the surface. In contrast, when the motion of the object is fast, and the stereoscopic image mapped to the surface would not appear to be stereoscopic, the display device only needs to cause the rendering unit 162 to process the right-view still/moving picture. This reduces an amount of loads required for the mapping processing, in particular the loads required for bitBLT from the memory unit 161B to the rendering unit 162, thereby facilitating the processing of combining the still/moving picture with the CG images of the object. As a result, the display device 10 is able to improve the quality of the combined images.

Fourth Embodiment

The display device according to a fourth embodiment of the present invention differs from that of the first embodiment in the point that, in the step S11, i.e., the step of generating the right-view frame shown in FIG. 3, the display device determines the motion of an object's monoscopic image instead of performing the step S24 shown in FIG. 5. Apart from the above point, the display device of the fourth embodiment has the same structure and the same function as that of the first embodiment. Accordingly, the following section describes some parts of the display device according to the fourth embodiment; the parts are modified or extended from the first embodiment. Details on the parts of the display device that are the same as those of the first embodiment can be found in the description of the first embodiment.

FIG. 18 is a flowchart of the step S11 shown in FIG. 3 that the display device according to the fourth embodiment of the present invention performs. Referring to FIG. 18, in the step S23, the determination unit 161A refers to the shape data of the object and determines whether or not the shape data is 2D data. When the shape data is 2D data, the processing moves to step S84. When the shape data is not 2D data, the processing moves to the step S25.

In the step S84, the object is a substantially flat monoscopic CG image, the entirety of which appears to have the same depth as the screen. As described below, the determination unit 161A determines a texture mode depending on a displacement of the object's representative point between two consecutive frames. The texture mode is stored in the memory unit 161B. Subsequently, the processing moves to the step S26.

Figure 19:
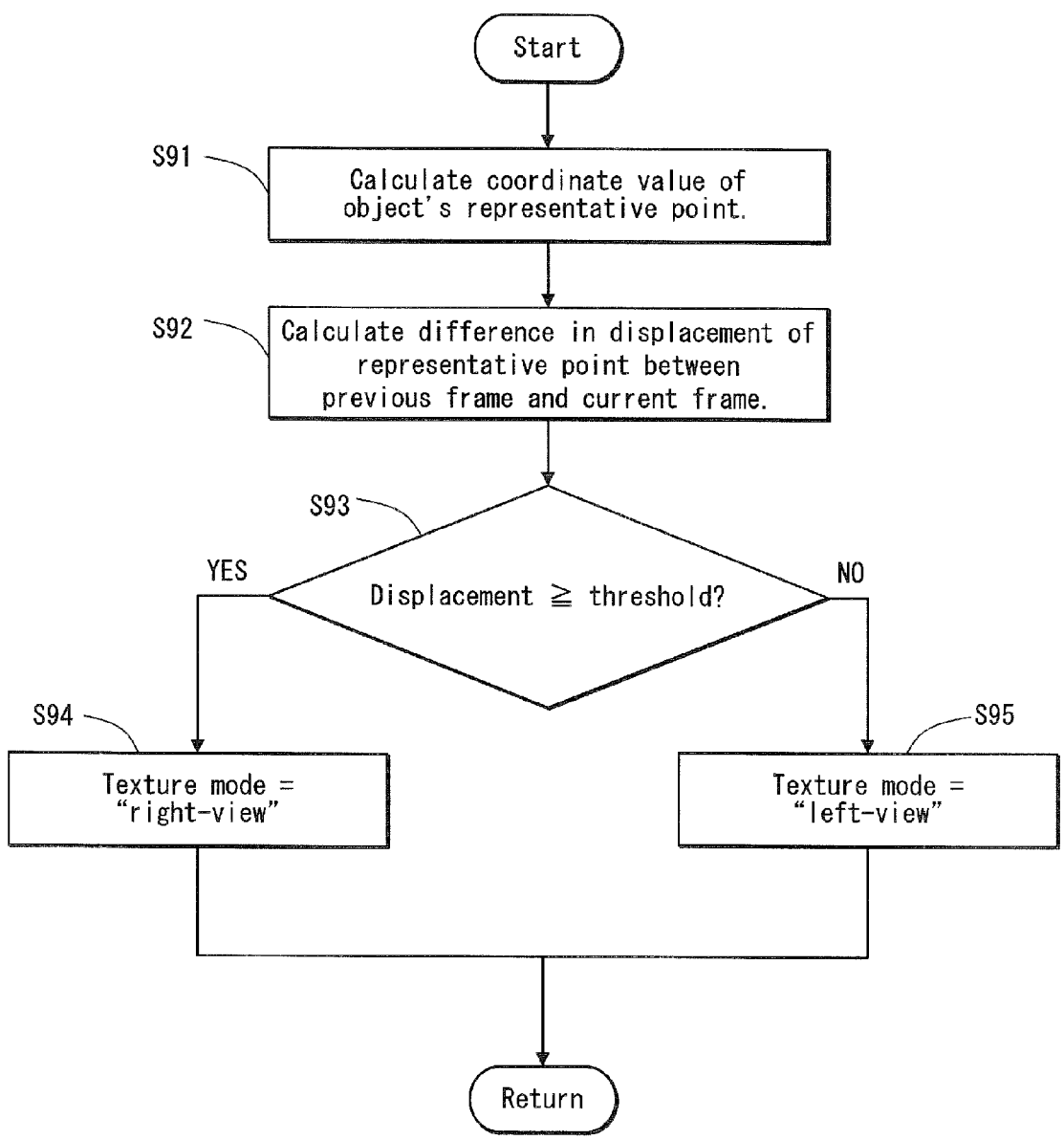
FIG. 19 is a flowchart of step S84 shown in FIG. 18.

FIG. 19 is a flowchart of the step S84 shown in FIG. 18. Unlike the determination unit in the first embodiment of the present invention, even when the shape data is 2D data, the determination unit 161A in the fourth embodiment determines the object's suitability for still/moving picture mapping depending on the displacement of an object's representative point (e.g., the object's center of mass) between two consecutive frames as follows. Note that the representative point is not limited to the center of mass and may be a point fixed to some part, such as the boundary, of the object.

In step S91, the determination unit 161A causes the rendering unit 162 to refer to the 2D data of the object, and thus calculate the coordinate value VG1 of the object's center of mass in the current frame from coordinate values $(x[i], y[i])^T$ of the vertices Ve[i] (i=0, 1, 2, ..., NV-1, where the letters NV represent a total number of the vertices) included in the current frame: $VG1=(x[0]+x[1]+x[2]+...+x[NV-1], y[0]+y[1]+y[2]+...+y[NV-1])^T/NV$. The coordinate value of the center of mass is stored in the memory unit 161B. Subsequently, the processing moves to step S92.

In the step S92, the determination unit 161A first reads from the memory unit 161B the coordinate value VG0 of the object's center of mass in a frame immediately before the current frame. Next, the determination unit 161A calculates the difference |VG1-VG0| between the coordinate value VG0 so read and the coordinate value VG1 calculated in the step S91. The difference indicates the displacement of the object's center of mass between the previous frame and the current frame. Subsequently, the processing moves to step S93.

In the step S93, the determination unit 161A determines whether or not the displacement |VG1-VG0| calculated in the step S92 is equal to or greater than a predetermined threshold by comparing the displacement with the predetermined threshold. The threshold herein is stored in the memory unit 161B by the control unit 161 in advance. The threshold represents a velocity of the object's center of mass; when the object moves at the velocity, a stereoscopic image mapped to the object surface fails to appear to be stereoscopic. When the displacement |VG1-VG0| calculated in the step S92 is equal to or greater than the threshold, the processing moves to step S94. When the displacement |VG1-VG0| calculated in the step S92 is less than the threshold, the processing moves to step S95.

In the step S94, the determination unit 161A sets the texture mode to "right-view". Since the velocity of the object's center of mass is equal to or greater than the threshold, the motion of the object's surface would be too fast to make a stereoscopic image mapped to the surface appear stereoscopic. For this reason, the texture mode is set so that the right-view still/moving picture is to be mapped to the left-view CG image of the object as is the case of the right-view CG image. This texture mode is stored in the memory unit 161B. Subsequently, the processing moves to the step S26 shown in FIG. 18.

In the step S95, the determination unit 161A sets the texture mode to "left-view". Since the velocity of the object's center of mass is less than the threshold, the stereoscopic image mapped to the object surface properly appears to be stereoscopic. For this reason, the texture mode is set so that the left-view still/moving picture is to be mapped to the left-view CG image of the object. This texture mode is stored in the memory unit 161B. Subsequently, the processing moves to the step S26 shown in FIG. 18.

Advantageous Effects of Fourth Embodiment

Figure 20A:
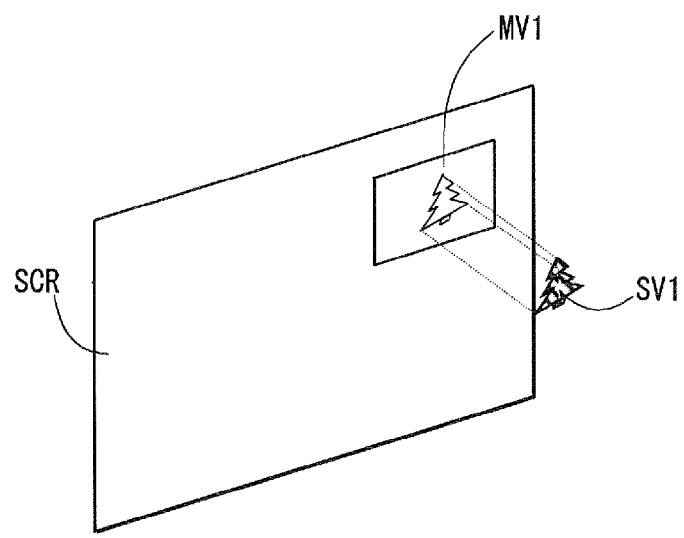
FIG. 20A is a schematic diagram showing a monoscopic CG image MV1 for a substantially rectangular object, along with a stereoscopic "tree" image ST1 mapped thereto.

FIG. 20A is a schematic diagram showing a monoscopic CG image MV1 of a substantially rectangular object, along with a stereoscopic "tree" image ST1 mapped thereto. The object's monoscopic CG image MV1 remains stationary on the screen SCR. In this case, the center of mass of the object's stereoscopic CG image MV1 is not displaced in consecutive frames. Accordingly, the right-view "tree" image is mapped to the CG image of the object, and thus a combined right-view monoscopic image is generated. On the other hand, the left-view "tree" image is mapped to the identical CG image of the object, and thus a combined left-view monoscopic image is generated. Consequently, as shown in FIG. 20A, the stereoscopic "tree" image ST1 appears to jump out from the object's monoscopic CG image MV1 towards the viewer.

Figure 20B:
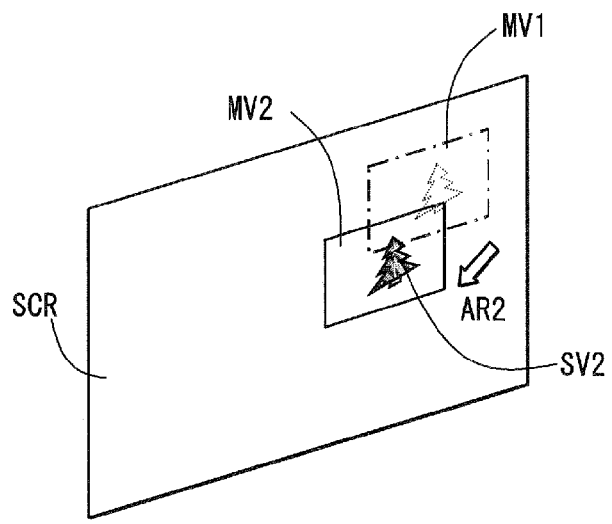
FIG. 20B is a schematic diagram showing a monoscopic CG image MV2 for the object in a frame next to the frame shown in FIG. 20A, along with a stereoscopic "tree" image ST2.

FIG. 20B is a schematic diagram showing a monoscopic CG image MV2 of the object in a frame next to the frame shown in FIG. 20A, along with a stereoscopic "tree" image ST2. As indicated by the arrow AR2 in FIG. 20B, the center of mass of the object's monoscopic CG image MV2 has been significantly displaced compared with the center of mass of the object's monoscopic CG image MV1 in the previous frame. In this case, only the right-view "tree" image is mapped to the CG image of the object, and thus combined left-view and right-view monoscopic images are generated. Consequently, the stereoscopic "tree" image appears to be pasted on the screen as is the case with the object's monoscopic CG image MV2. Similarly, during a period when the center of mass of the object's monoscopic CG image is significantly displaced each time frames are switched, only the right-view "tree" images are mapped to the stereoscopic CG images. Consequently, during the period, the stereoscopic "tree" image appears to move on the screen together with the object's monoscopic CG images.

Figure 20C:
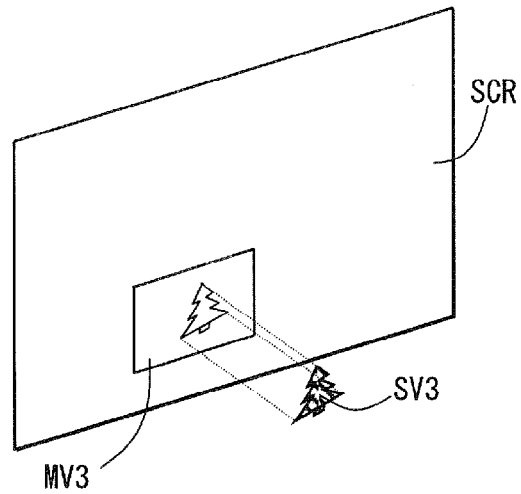
FIG. 20C is a schematic diagram showing a monoscopic CG image MV3 for the object in a frame that is several frames after the frame shown in FIG. 20B, along with a stereoscopic "tree" image ST3.

FIG. 20C is a schematic diagram showing a monoscopic CG image MV3 of the object and a stereoscopic "tree" image ST3 in a frame that is placed after several frames starting from the frame shown in FIG. 20B. Again, the object's monoscopic CG image MV3 remains stationary on the screen SCR. In this case, the center of mass of the object's monoscopic CG mage MV3 is not displaced in consecutive frames. Accordingly, the right-view "tree" image is mapped to the CG image of the object, and thus a combined right-view monoscopic image is generated. The left-view "tree" image is also mapped to the CG image of the object, and thus a combined left-view monoscopic image is generated. Consequently, as shown in FIG. 20C, the stereoscopic "tree" image ST3 appears to jump out from the object's monoscopic CG image MV3 towards the viewer.

As shown in FIGS. 20A to 20C, the display device according to the fourth embodiment of the present invention maps the stereoscopic image of a still/moving picture to a surface of an object when the object's center of mass is displaced by a relatively small amount between two consecutive frames, and maps the (right-view) monoscopic image of the still/moving picture to the surface when the object's center of mass is displaced by a relatively large amount between two consecutive frames. Consequently, when the motion of the object is relatively slow, the display device 10 is able to make the still/moving picture appear to float above the surface or to be located behind the surface. In contrast, when the object surface is substantially flat but the motion of the object is so fast that the stereoscopic image mapped to the surface would not appear to be stereoscopic, the display device only needs to cause the rendering unit 162 to process the right-view still/moving picture. This reduces an amount of loads required for the mapping processing, in particular the loads required for bitBLT from the memory unit 161B to the rendering unit 162, thereby facilitating the processing of combining the still/moving picture with the CG image of the object. As a result, the display device 10 is able to improve the quality of the combined images.

<<Modifications>>

(A) As shown in FIG. 3, the above embodiments of the present invention generate a right-view frame before a left-view frame when displaying one frame of a stereoscopic image. Alternatively, a left-view frame may be generated before a right-view frame. In this case, the texture mode is set in an opposite manner to the above-described examples. For example, in the step S24 shown in FIG. 5, the right-view still/moving picture should be mapped to the right-view CG image of the object, and hence the texture mode is set to "right-view". Also, in FIG. 7, when the curvature is equal to or greater than the threshold, the processing moves to the step S35. When the curvature is less than the threshold, the processing moves to the step S35. In the step S35, since the object surface curvature is equal to or greater than the threshold, the determination unit 161A sets the texture mode to "left-view", so that the left-view still/moving picture is mapped to the right-view CG image of the object as is the case with the left-view CG image. In the step S34, on the other hand, since the object surface curvature is less than the threshold, the determination unit 161A sets the texture mode to "right-view", so that the right-view still/moving picture is mapped to the right-view CG image of the object.

(B) The above embodiments of the present invention are premised on the frame sequential method. However, a polarizing display method or a method that uses a lenticular lens may also be used. In the "polarizing display method", two polarization filters having different polarization directions from each other are separately provided in the display areas of a left-view frame (e.g., odd-numbered lines) and the display areas of a right-view frame (e.g., even-numbered lines). In this case, the viewer sees the display through polarization glasses. In the polarization glasses, two polarization filters having different polarization directions from each other are separately provided for the left lens and the right lens. Consequently, the left-view and the right-view frames are each perceived only by the corresponding eyes, thereby allowing the viewer to perceive 3D images. In a "method using a lenticular lens", a left-view frame and a right-view frame are each divided into vertically long and narrow rectangular shaped small areas. The small areas of the right-view frame and the small areas of the left-view frame are alternately arranged in a horizontal direction on the screen and displayed at the same time. The surface of the screen is covered by a lenticular lens. The lenticular lens is a sheet-shaped lens array consisting of multiple long and thin hog-backed lenses arranged in parallel. Each hog-backed lens lies in the longitudinal direction on the surface of the screen. When the viewer sees the left-view and the right-view frames through the lenticular lens, only the viewer's left eye perceives light from the display areas of the left-view frame, and only the viewer's right eye perceives light from the display areas of the right-view frame. The viewer thus sees a 3D image because of the binocular parallax between the images separately perceived by the left and right eyes. Note that according to this method, another optical component having similar functions, such as a liquid crystal device, may be used instead of the lenticular lens.

The output unit 162C shown in FIG. 1 converts a frame output format in conformity with a 3D display scheme of the display unit 170. When the display unit 170 employs the "polarizing display method", the output unit 162C combines a pair of a left-view frame and a right-view frame into one frame by using a buffer memory embedded in the unit 162C.

More particularly, the output unit 162C temporarily stores the right-view frame that has been combined earlier. After that, the output unit 162C combines the left-view frame and further combines the left-view frame with the right-view frame stored in the buffer memory. When the frames are combined, the left-view and the right-view frames are alternately arranged in units of lines and thus one frame is reconfigured. When the display unit 170 employs the method using a lenticular lens, the output unit 162C also combines a pair of a left-view frame and a right-view frame into one frame by using the buffer memory embedded in the unit 162C. More particularly, the output unit 162C temporarily stores the right-view frame that has been combined earlier. After that, the output unit 162C combines the left-view frame and further combines the left-view frame with the right-view frame stored in the buffer memory. When the frames are combined, the left-view and the right-view frames are each divided into vertically long and narrow rectangular shaped small areas. The small areas of the right-view frame and the small areas of the left-view frame are alternately arranged in a horizontal direction of one frame, and thus a frame is reconfigured. The frame so combined is transmitted to the display unit 170.

(C) When a plurality of objects are displayed in one frame, the display device may determine the texture mode separately for each object. FIG. 21 is a flowchart of processing to generate right-view and left-view frames by mapping stereoscopic still/moving pictures to CG images of the objects. The display device starts the processing upon receiving via the operation unit 140 a user instruction to execute the viewer function or the slideshow function.

In step S101, the display device initializes an integer variable N to "1". In the next step S11, the display device generates an image in which the right-view still/moving picture is mapped to the right-view CG image of the Nth object, and combines the generated image to the right-view frame. In the next step S102, the display device determines whether the variable N has reached a total number of the objects. When the variable N is less than the total number of the objects, the processing moves to step S103. When the variable N is equal to the total number of the objects, the processing moves to step S104. In the step S103, a new variable N is set to the original variable N plus 1. Subsequently, the processing repeats from the step S11. By the step S11 through the step S103 being repeated, right-view still/moving pictures are mapped to the right-view CG images of all objects, and these images are combined into one right-view frame. The data of the frame is transmitted to the display unit 170. Furthermore, a list of the texture modes for the respective objects are stored in the memory unit 161B.

In step S104, the display device initializes the integer value N to "1" again. In the next step S12, the display device first determines which one of the left-view and the right-view still/moving picture should be mapped to the left-view CG image of the Nth object by referring to the list of the texture modes. Next, the display device maps the still/moving picture, as designated by a result of the determination, to the left-view CG image of the Nth object, and combines the obtained image into the left-view frame. In the next step S105, the display device determines whether the variable N has reached the total number of the objects. When the variable N is less than the total number of the objects, the processing moves to step S106. When the variable N is equal to the total number of the objects, the processing moves to the step S13. In the step S106, a new variable N is set to the original variable N plus 1. Subsequently, the processing repeats from the step S12. By the step S12 through the step S106 being repeated, left-view still/moving pictures are mapped to the left-view CG images of all objects, and these images are combined into one left-view frame. The data of the frame is transmitted to the display unit 170. In the subsequent step S13, the display device checks whether a next frame to be processed is present in the still/moving pictures. If the next frame is present, the processing repeats from the step S10. If the next frame is not present, the processing ends.

(D) As shown in FIG. 5, the above embodiments of the present invention, when the shape data of an object is 2D data, maps a still/moving picture as a stereoscopic image to the monoscopic CG image of the object. Alternatively, when the shape data of an object is 2D data, the still/moving picture may be mapped to the monoscopic CG image of the object as a monoscopic image. In this case, the CG image of the object and the still/moving picture are displayed at the same depth.

FIG. 22 is a flowchart of processing performed by the display device in the above case to map still/moving pictures to a CG image of an object. The display device starts the processing upon receiving via the operation unit 140 a user instruction to execute the viewer function or the slideshow function. Unlike the flowcharts shown in FIGS. 3 and 5, the flowchart shown in FIG. 22 includes steps S111 and S112 of generating monoscopic images, namely 2D frames, instead of the step S24. Apart from the above point, the flowchart shown in FIG. 22 is the same as those shown in FIGS. 3 and 5. Accordingly, the following section describes some steps shown in FIG. 22; the steps are modified or extended from the steps shown in FIGS. 3 and 5. Details on the steps that are the same as those in FIGS. 3 and 5 can be found in the description of FIGS. 3 and 5.

Referring to FIG. 22, in the step S23, the determination unit 161A refers to the shape data of the object and determines whether or not the shape data is 2D data. When the shape data is 2D data, the processing moves to the step S111. When the shape data is not 2D data, the processing moves to the step S25.

In the step S111, the control unit 161 causes the rendering unit 162 to use right-view camera parameters to perform a view coordinate transformation on the 2D data of the object. More particularly, the control unit 161 first causes the rendering unit 162 to transform the coordinate values of vertices represented by the 2D data into four-dimensional homogeneous coordinate values. The 2D coordinate values $(x[i], y[i])^T$ of the (i+1)th vertices Ve[i] (i=0, 1, 2, . . . ) are transformed into the four-dimensional homogeneous coordinate values $Vh[i]=(x[i], y[i], 0, 1)^T$. Next, the control unit 161 causes the rendering unit 162 to calculate products Mv*Vh[i] of the coordinate transformation matrix My included in the right-view camera parameters and the four-dimensional homogeneous coordinate values $Vh[i]=(x[i], y[i], 0, 1)^T$ of the vertices. The vertex shader 222A is utilized for the calculation. Subsequently, the processing moves to the step S112.

In the step S112, the control unit 161 causes the mapping unit 162A to use the shape data represented by the view coordinate values to map the right-view still/moving picture to the CG image of the object. Detail of the mapping processing can be found in the previously given description. Thus, the right-view still/moving picture is combined with the CG image of the object, and thus a 2D frame is generated. Subsequently, the processing moves to the step S13 shown in FIG. 3 while skipping the step S12 of generating the left-view frame.

In the example shown in FIG. 22, when the shape data of the object is 2D data, the combined image of the still/moving picture and the object is automatically displayed as the monoscopic image. Alternatively, the display device may prompt the user to select via the operation unit 140 whether or not to display the combined image of the still/moving picture and the object as the stereoscopic image.

INDUSTRIAL APPLICABILITY

The present invention relates to technologies for displaying stereoscopic images which are generated by mapping images to CG images of an object as described above. Thus, the present invention obviously has industrial applicability.

REFERENCE SIGNS LIST

POB object
POL left-view monoscopic CG image of object POB
POR right-view monoscopic CG image of object POB
SCL left-view 2D screen
SCR right-view 2D screen
VPL viewpoint of left eye of viewer
VPR viewpoint of right eye of viewer
LV left-view "tree" image
RV right-view "tree" image
SV1 stereoscopic "tree" image
SV2 stereoscopic CG image of object

The invention claimed is:

1. A CG image combining device for generating a CG image by mapping an image to an object, comprising:
 a memory unit storing shape data and a pair of left-view image data and right-view image data, the shape data representing a shape of the object, the pair of left-view image data and right-view image data collectively representing a stereoscopic image;
 a determination unit operable to determine from the shape data whether or not the object is suitable for mapping of the stereoscopic image; and
 a mapping unit operable to (i) generate left-view CG data by combining the left-view image data with the shape data and generate right-view CG data by combining the right-view image data with the shape data, when the determination unit has determined that the object is suitable for mapping of the stereoscopic image, and (ii) generate left-view CG data and right-view CG data by combining one of the left-view image data and the right-view image data with the shape data, when the determination unit has determined that the object is not suitable for mapping of the stereoscopic image.

2. The CG image combining device of claim 1, wherein the shape data is 3D data representing the shape of the object in 3D virtual space, and
 the determination unit (i) calculates normal vectors of polygons constituting the object from the 3D data, (ii) evaluates a curvature of a surface of the object from the calculated normal vectors, (iii) determines that the object is suitable for mapping of the stereoscopic image when the curvature is less than a predetermined threshold, and (iv) determines that the object is not suitable for mapping of the stereoscopic image when the curvature is greater than the predetermined threshold.

3. The CG image combining device of claim 1, wherein the shape data is 3D data representing the shape of the object in 3D virtual space, and
 the determination unit (i) calculates brightnesses at vertices of polygons constituting the object from the 3D data, (ii) determines that the object is suitable for mapping of the stereoscopic image when a difference between a maximum brightness and a minimum brightness among the calculated brightnesses is less than a predetermined threshold, and (iii) determines that the object is not suitable for mapping of the stereoscopic image when the difference between the maximum brightness and the minimum brightness is greater than the predetermined threshold.

4. The CG image combining device of claim 1, wherein the shape data is 3D data representing the shape of the object in 3D virtual space, and
 the determination unit (i) determines, in each of a plurality of frames constituting the CG image, a representative point of the object from vertices of polygons constituting the object, (ii) determines that the object is suitable for mapping of the stereoscopic image when a displacement of the representative point between two consecutive frames is less than a predetermined threshold, and (iii) determines that the object is not suitable for mapping of the stereoscopic image when the displacement of the representative point is greater than the predetermined threshold.

5. The CG image combining device of claim 1, wherein the shape data is 2D data representing the shape of the object on a 2D plane, and
 the determination unit (i) determines, in each of a plurality of frames constituting the CG image, a representative point of the object from the 2D data, (ii) determines that the object is suitable for mapping of the stereoscopic image when a displacement of the representative point between two consecutive frames is less than a predetermined threshold, and (iii) determines that the object is not suitable for mapping of the stereoscopic image when the displacement of the representative point is greater than the predetermined threshold.

6. The CG image combining device of claim 1, wherein the shape data is one of 2D data representing the shape of the object on a 2D plane and 3D data representing the shape of the object in 3D virtual space,
 the determination unit (i) recognizes whether the shape data is the 2D data or the 3D data, (ii) determines that the object is suitable for mapping of the stereoscopic image when the shape data is the 2D data, and (iii) further determines whether or not the object is suitable for mapping of the stereoscopic image from the 3D data when the shape data is the 3D data.

7. The CG image combining device of claim 1, further comprising:
 an operation unit operable to receive a user operation indicating which one of a monoscopic image and the stereoscopic image is to be mapped to the object, wherein
 the determination unit determines that the object is not suitable for mapping of the stereoscopic image when the user operation indicates that the monoscopic image is to be mapped to the object.

8. A CG image combining method for generating a CG image by mapping an image to an object, comprising:
 determining from shape data whether or not the object is suitable for mapping of a stereoscopic image, the shape data representing a shape of the object, a pair of left-view image data and right-view image data collectively representing the stereoscopic image;
 generating left-view CG data by combining the left-view image data with the shape data and generating right-view CG data by combining the right-view image data with the shape data, when the object has been determined to be suitable for mapping of the stereoscopic image; and
 generating left-view CG data and right-view CG data by combining one of the left-view image data and the right-view image data with the shape data, when the object has been determined not to be suitable for mapping of the stereoscopic image.

9. A program stored on a non-transitory recording medium for causing a computer to perform processing of generating a CG image by mapping an image to an object, the processing comprising:

determining from shape data whether or not the object is suitable for mapping of a stereoscopic image, the shape data representing a shape of the object, a pair of left-view image data and right-view image data collectively representing the stereoscopic image;

generating left-view CG data by combining the left-view image data with the shape data and generating right-view CG data by combining the right-view image data with the shape data, when the object has been determined to be suitable for mapping of the stereoscopic image; and generating left-view CG data and right-view CG data by combining one of the left-view image data and the right-view image data with the shape data, when the object has been determined not to be suitable for mapping of the stereoscopic image.

10. A non-transitory recording medium that stores a program for causing a computer to perform processing of generating a CG image by mapping an image to an object, the processing comprising:

determining from shape data whether or not the object is suitable for mapping of a stereoscopic image, the shape data representing a shape of the object, a pair of left-view image data and right-view image data collectively representing the stereoscopic image;

generating left-view CG data by combining the left-view image data with the shape data and generating right-view CG data by combining the right-view image data with the shape data, when the object has been determined to be suitable for mapping of the stereoscopic image; and generating left-view CG data and right-view CG data by combining one of the left-view image data and the right-view image data with the shape data, when the object has been determined not to be suitable for mapping of the stereoscopic image.

11. An integrated circuit mounted on a device for generating a CG image by mapping an image to an object, comprising:

a memory unit for storing shape data and a pair of left-view image data and right-view image data, the shape data representing a shape of the object, the pair of left-view image data and right-view image data collectively representing a stereoscopic image;

a determination unit operable to determine from the shape data whether or not the object is suitable for mapping of the stereoscopic image; and a mapping unit operable to (i) generate left-view CG data by combining the left-view image data with the shape data and generate right-view CG data by combining the right-view image data with the shape data, when the determination unit has determined that the object is suitable for mapping of the stereoscopic image, and (ii) generate left-view CG data and right-view CG data by combining one of the left-view image data and the right-view image data with the shape data, when the determination unit has determined that the object is not suitable for mapping of the stereoscopic image.

12. A display device for mapping an image to an object and displaying a CG image generated by the mapping, comprising:

a memory unit storing shape data and a pair of left-view image data and right-view image data, the shape data representing a shape of the object, the pair of left-view image data and right-view image data collectively representing a stereoscopic image;

a determination unit operable to determine from the shape data whether or not the object is suitable for mapping of the stereoscopic image;

a mapping unit operable to (i) generate left-view CG data by combining the left-view image data with the shape data and generate right-view CG data by combining the right-view image data with the shape data, when the determination unit has determined that the object is suitable for mapping of the stereoscopic image, and (ii) generate left-view CG data and right-view CG data by combining one of the left-view image data and the right-view image data with the shape data, when the determination unit has determined that the object is not suitable for mapping of the stereoscopic image; and a display unit including a display panel and operable to alternately display left-view CG image and right-view CG image on the display panel, the left-view CG image and the right-view CG image represented by the left-view CG data and the right-view CG data, respectively.

* * * * *